United States Patent
Atarashi et al.

(10) Patent No.: US 7,615,948 B2
(45) Date of Patent: Nov. 10, 2009

(54) CONTROLLER FOR MOTOR AND CONTROL METHOD FOR MOTOR

(75) Inventors: Hirofumi Atarashi, Wako (JP); Hiroyuki Isegawa, Wako (JP); Masaaki Kaizuka, Wako (JP); Masanari Fukuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 11/806,131

(22) Filed: May 30, 2007

(65) Prior Publication Data

US 2007/0290633 A1 Dec. 20, 2007

(30) Foreign Application Priority Data

May 31, 2006 (JP) ............................. 2006-151924

(51) Int. Cl.
*H02P 6/12* (2006.01)
*H02P 21/00* (2006.01)
*H02P 25/30* (2006.01)

(52) U.S. Cl. .................. 318/400.09; 318/148; 318/494; 318/400.02; 318/563

(58) Field of Classification Search ............ 318/400.09, 318/400.02, 148, 563, 494
See application file for complete search history.

(56) References Cited

U.S. PATENT DOCUMENTS

| | | | |
|---|---|---|---|
| 4,305,031 A | 12/1981 | Wharton | |
| 5,245,238 A | 9/1993 | Lynch et al. | |
| 6,081,093 A * | 6/2000 | Oguro et al. | 318/807 |
| 6,563,246 B1 | 5/2003 | Kajiura et al. | |
| 7,443,117 B2 * | 10/2008 | Egami et al. | 318/139 |
| 7,474,067 B2 * | 1/2009 | Ueda et al. | 318/432 |
| 7,525,269 B2 * | 4/2009 | Patel et al. | 318/432 |
| 7,538,510 B2 * | 5/2009 | Atarashi et al. | 318/494 |
| 7,548,034 B2 * | 6/2009 | Takahashi et al. | 318/268 |
| 2004/0189243 A1 * | 9/2004 | Tobari et al. | |
| 2007/0132415 A1 * | 6/2007 | Patel et al. | |
| 2007/0145927 A1 * | 6/2007 | Egami et al. | |
| 2007/0194763 A1 * | 8/2007 | Egami et al. | |
| 2007/0222405 A1 * | 9/2007 | Atarashi et al. | |
| 2007/0222406 A1 * | 9/2007 | Atarashi et al. | |
| 2007/0229009 A1 * | 10/2007 | Egami et al. | 318/432 |
| 2008/0024082 A1 * | 1/2008 | Atarashi et al. | 318/496 |

(Continued)

FOREIGN PATENT DOCUMENTS

JP 2002-204541 A 7/2002

*Primary Examiner*—Paul Ip
(74) *Attorney, Agent, or Firm*—Arent Fox LLP.

(57) ABSTRACT

A controller for a motor and a control method for a motor change an operating condition of each motor, considering difference in operating conditions, such as loss and temperature, thus making it possible to reduce a total loss in a plurality of motors. The controller includes a first motor operating condition calculator and a second motor operating condition calculator which calculate the estimated values of losses incurred when a first motor and a second motor are driven, and a DC voltage control unit which carries out, on a motor having a largest estimated value of loss, the processing for changing a supply voltage to change the voltage of DC power supplied to inverters by a DC/DC converter, thereby reducing the difference between a phase voltage, which is the resultant vector of the voltages across terminals of the motor, and a target voltage set on the basis of an output voltage of the DC/DC converter.

7 Claims, 16 Drawing Sheets

U.S. PATENT DOCUMENTS

| | | | |
|---|---|---|---|
| 2008/0030163 A1* | 2/2008 | Fukuchi et al. | 318/801 |
| 2008/0036415 A1* | 2/2008 | Kaizuka et al. | 318/730 |
| 2008/0129237 A1* | 6/2008 | Atarashi et al. | 318/492 |
| 2008/0143281 A1* | 6/2008 | Yaguchi | 318/139 |
| 2008/0143286 A1* | 6/2008 | Egami | 318/432 |

* cited by examiner

US 7,615,948 B2

CONTROLLER FOR MOTOR AND CONTROL METHOD FOR MOTOR

BACKGROUND OF THE INVENTION

1. Field of the Invention

The present invention relates to a controller for a motor and a control method for a motor adapted to control the operations of a plurality of permanent magnet field type rotary motors.

2. Description of the Related Art

Hitherto, there has been known a motor which has a first rotor and a second rotor concentrically provided around a rotating shaft of a permanent magnet field type rotary motor and which is adapted to conduct field control by changing a phase difference between the first rotor and the second rotor according to a rotational velocity thereby to change an induced voltage constant (refer to, for example, Japanese publication of unexamined patent application No. 2002-204541).

In such a conventional motor, the first rotor and the second rotor are connected through the intermediary of a member that is displaced in the radial direction when subjected to a centrifugal force. The motor is configured such that, when the motor is in a halting state, the magnetic poles of the permanent magnets disposed in the first rotor and the magnetic poles of the permanent magnets disposed in the second rotor are oriented in the same direction, providing largest magnetic fluxes of the fields, i.e., a largest induced voltage constant of the motor. As the rotational velocity of the motor increases, the phase difference between the first rotor and the second rotor increases due to a centrifugal force, thus reducing the magnetic fluxes of the fields, i.e., reducing the induced voltage constant of the motor.

FIG. 16 shows a range in which the field of the motor need to be weakened, the axis of ordinates indicating output torque Tr and the axis of abscissas indicating a number of revolutions N. In FIG. 16, a character "u" denotes an orthogonal line of the motor. The line u is formed by connecting the points at which a phase voltage of the motor becomes equal to a supply voltage, depending on a combination of the number of revolutions and an output torque when the motor is actuated without carrying out the field weakening control. A character X in the figure denotes a range in which the field weakening is not required, while a character Y denotes a range in which the field weakening is required.

As shown in FIG. 16, the range Y in which the field weakening is necessary is determined by the number of revolutions N and the output torque Tr of the motor. Hence, in the conventional field weakening control, which depends merely on the number of revolutions, a change of an induced voltage constant of the motor has inconveniently become excessive or insufficient with respect to a required field weakening control amount.

The aforesaid motor that changes the phase difference between the first rotor and the second rotor according to the number of revolutions allows an operating condition of the motor to be changed according to a change in the number of revolutions of the motor. However, in a system adapted to operate a plurality of motors in cooperation, such as a hybrid car wherein front wheels and rear wheels thereof are driven by separate motors, it is required to change the operating condition of each motor by considering differences in operating states, including a loss incurred in each motor and the temperature thereof.

When individually setting the operating condition of each motor according to the number of revolutions of the motor, it is impossible to change the operating condition of each motor while considering differences in the operating states, including loss and temperature, between the motors.

SUMMARY OF THE INVENTION

It is an object of the present invention, therefore, to provide a controller for a motor and a control method for a motor that change an operating condition of each motor, considering a difference in an operating state, such as loss and temperature, between motors, thus making it possible to reduce a total loss when operating a plurality of motors.

The present invention has been made to fulfill the aforesaid object, and a controller for a motor in accordance with the present invention includes a plurality of drive circuits for driving a plurality of permanent magnet type rotary motors; a DC power source for supplying DC power to the drive circuits; an output voltage changer for changing an output voltage of the DC power source; a motor loss estimator for determining, on each of the motor, an estimated value of a loss, which is incurred when driving a motor, on the basis of at least one of a loss in the drive circuit and a loss in the motor driven by the drive circuit; and a voltage difference reduction controller which carries out, when driving the plurality of motors by the plurality of drive circuits, supply voltage changing processing to change the voltage of DC power supplied to the drive circuit for driving a motor that has a largest estimated value of loss by the output voltage changer so as to reduce a difference between a phase voltage, which is a resultant vector of the voltages across the terminals of an armature of each phase of the motor and a first target voltage, which is set on the basis of an output voltage of the DC power source.

With this arrangement, the estimated value of the loss incurred when driving the plurality of motors is determined for each of the motors by the motor loss estimator. Further, the voltage difference reduction controller carries out the supply voltage changing processing on the motor having the largest estimated value of loss so as to conduct control for reducing the difference between the phase voltage of the motor and the first target voltage. Thus, reducing the difference between the phase voltage of the motor having the largest estimated value of loss and the first target voltage makes it possible to reduce a copper loss and an iron loss that occur in the motor and power loss in the drive circuit for driving the motor. Hence, the loss in the motor having the largest loss is reduced, permitting a reduction in a total loss when driving the plurality of motors.

Preferably, the voltage difference reduction controller carries out, on a motor having a largest estimated value of loss, field weakening current changing processing for changing the energization amount of a field weakening current for producing a voltage with a sign that is reversed from the sign of an induced voltage generated in an armature of the motor, thereby reducing the difference between the phase voltage of the motor and the first target voltage.

With this arrangement, the voltage difference reduction controller carries out the field weakening current changing processing so as to further reduce the difference between the phase voltage of the motor having the largest estimated value of loss and the first target voltage, thus permitting a further reduction in the loss in the motor.

Preferably, at least one of the motors is a double-rotor motor with a first rotor and a second rotor which have a plurality of magnetic fields by permanent magnets and which are disposed around a rotating shaft, and the voltage difference reduction controller carries out rotor phase difference changing processing for changing a rotor phase difference as the phase difference between the first rotor and the second rotor of the double-rotor motor, so as to reduce the difference between the phase voltage and the first target voltage of the double-rotor motor if a motor having the largest estimated value of loss is the double-rotor motor.

With this arrangement, the voltage difference reduction controller changes the rotor phase difference so as to change the induced voltage constant of the motor, thereby changing the induced voltage generated in the armature of each phase of the motor to make it possible to change the phase voltage of the motor. Thus, the difference between the phase voltage of the motor having the largest estimated value of loss and the first target voltage can be further reduced, permitting a further reduction in the loss in the motor.

Preferably, the controller for a motor includes a motor temperature detector for detecting the temperature of each motor, wherein if there is a motor having a temperature that is higher than the temperature of the motor estimated to have the largest loss, then the voltage difference reduction controller prohibits carrying out the supply voltage changing processing on the motor estimated to have the largest loss and carries out the supply voltage changing processing on the motor having the higher temperature thereby to reduce the difference between the phase voltage and the first target voltage of the motor having the higher temperature.

With this arrangement, if there is a motor having a temperature that is higher than the temperature of the motor having a largest estimated value of loss, then the voltage difference reduction controller executes the aforesaid supply voltage processing on the motor having the higher temperature rather than on the motor having the largest estimated value of loss. Further, the difference between a phase voltage of the motor having the higher temperature and the voltage of DC power supplied to the drive circuit of the motor having the higher temperature is reduced. This makes it possible to reduce the loss in the motor with the higher temperature thereby to lower a calorific value, thus restraining deterioration in performance caused by heat generation.

Preferably, the aforesaid DC power source is a storage battery, and at least one of the motors acts also as a generator to supply electric power to the drive circuits of other motors and also to supply charging current to the storage battery through the intermediary of the voltage changer. If the motor estimated to have a largest loss is a motor other than the motor in operation as a generator and the input/output current of the voltage changer is a predetermined level or less, then the voltage difference reduction controller prohibits the execution of the supply voltage changing processing and controls the output power of the motor in operation as the generator such that the difference between a second target voltage, which is set on the basis of the voltage supplied to the drive circuit of the motor estimated to have the largest loss by the motor in operation as the generator, and the phase voltage of the motor estimated to have the largest loss is reduced.

With this arrangement, if the input/output current of the voltage changer is a predetermined level or less and the DC power supplied to the drive circuits mostly depends on the power generated by the motor in operation as the generator, then the voltage difference reduction controller controls the output voltage of the motor in operation as the generator such that the difference between the phase voltage of an armature of each phase of the motor having the largest estimated value of loss and the second target voltage is reduced. This makes it possible to reduce the loss in the motor having the largest estimated value of loss.

Preferably, the controller for a motor includes a device which handles the motor by converting the motor into an equivalent circuit in terms of a two-phase AC fixed coordinate system or a two-phase DC rotation coordinate system based on the position of the first rotor, and calculates the magnitude of a resultant vector of a converted value in the equivalent circuit of the voltage between the terminals of the armature of the motor as the phase voltage.

With this arrangement, the voltage between the terminals of the armature of the motor can be easily calculated by calculating the magnitude of the resultant vector of the converted value of the voltage between the terminals of the armature of the motor in the equivalent circuit.

A control method for a motor in accordance with the present invention relates to a method for controlling the operation of a rotary motor by a controller for a motor equipped with a plurality of drive circuits for driving a plurality of permanent magnet rotary motors, a DC power source for supplying DC power to the drive circuits, and an output voltage changer for changing an output voltage of the DC power source.

The method for a motor includes a motor loss estimating step wherein the controller determines, for each of the motors, an estimated value of loss incurred when driving the motors on the basis of at least one of the loss in the drive circuit or the loss in a motor driven by the drive circuit; and a voltage difference reducing step wherein, when driving the plurality of motors by the plurality of drive circuits, the controller reduces the difference between a phase voltage, which is a resultant vector of a voltage between the terminals of an armature of each phase of the motor, and a first target voltage, which is set on the basis of an output voltage of the DC power source, by carrying out supply voltage changing processing for changing the voltage of the DC power supplied to the drive circuit that drives the motor having a largest estimated value of loss by the output voltage changer.

With this arrangement, the controller determines the estimated value of loss, which is incurred when driving the plurality of motors, for each motor by the motor loss estimating step. Further, the controller implements the supply voltage changing processing on the motor having the largest estimated value of loss by the voltage difference reducing step so as to reduce the difference between the phase voltage of the motor and the first target voltage. Thus, reducing the difference between the phase voltage of the motor having the largest estimated value of loss and the first target voltage makes it possible to reduce a copper loss and an iron loss that occur in the motor and power loss in the drive circuit which drives the motor. Hence, the loss in the motor having the largest loss is reduced, permitting a reduction in a total loss when driving the plurality of motors.

DESCRIPTION OF THE PREFERRED EMBODIMENTS

Figure 1:
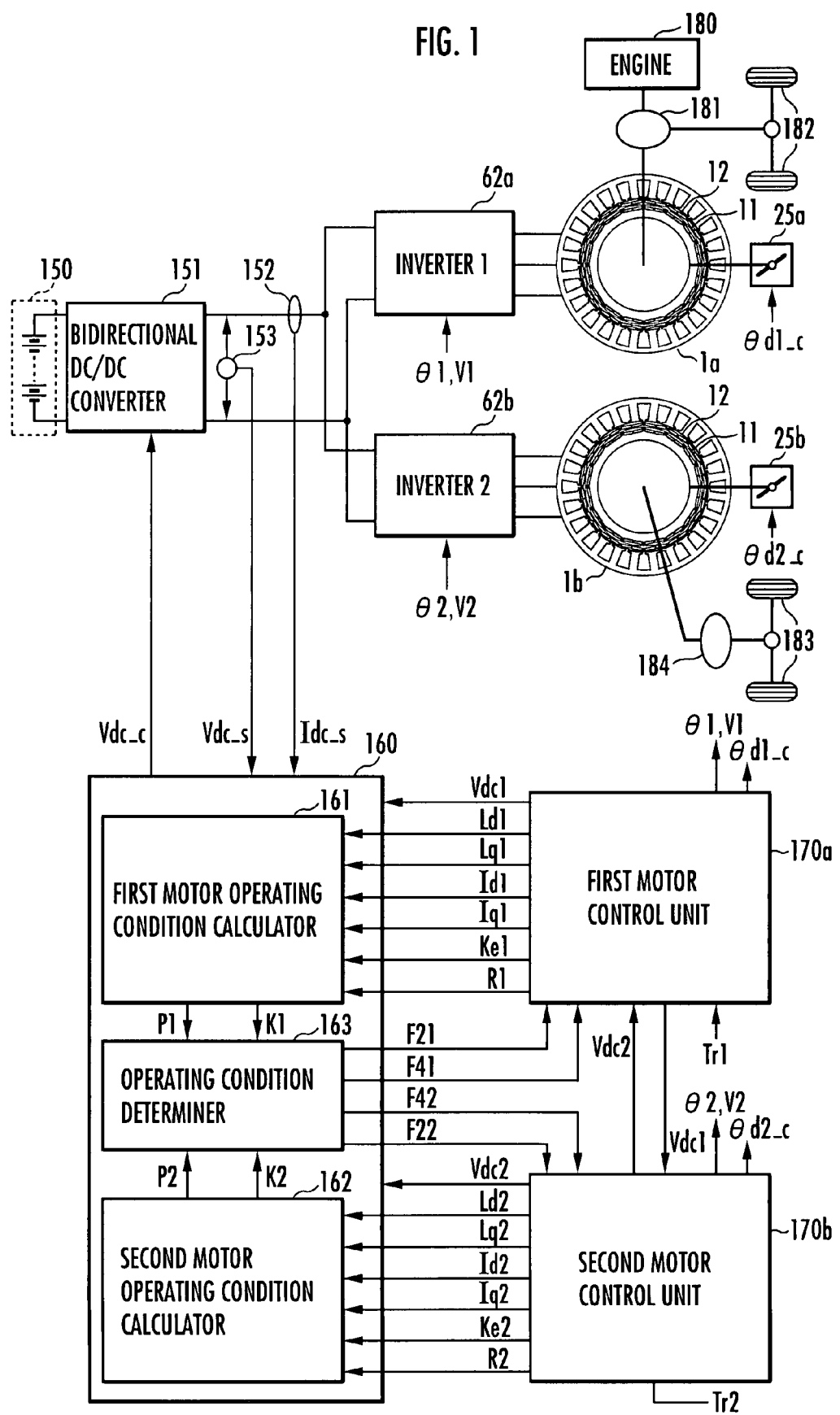
FIG. 1 is an overall configuration diagram a controller for a motor in accordance with the present invention.
Figure 2:
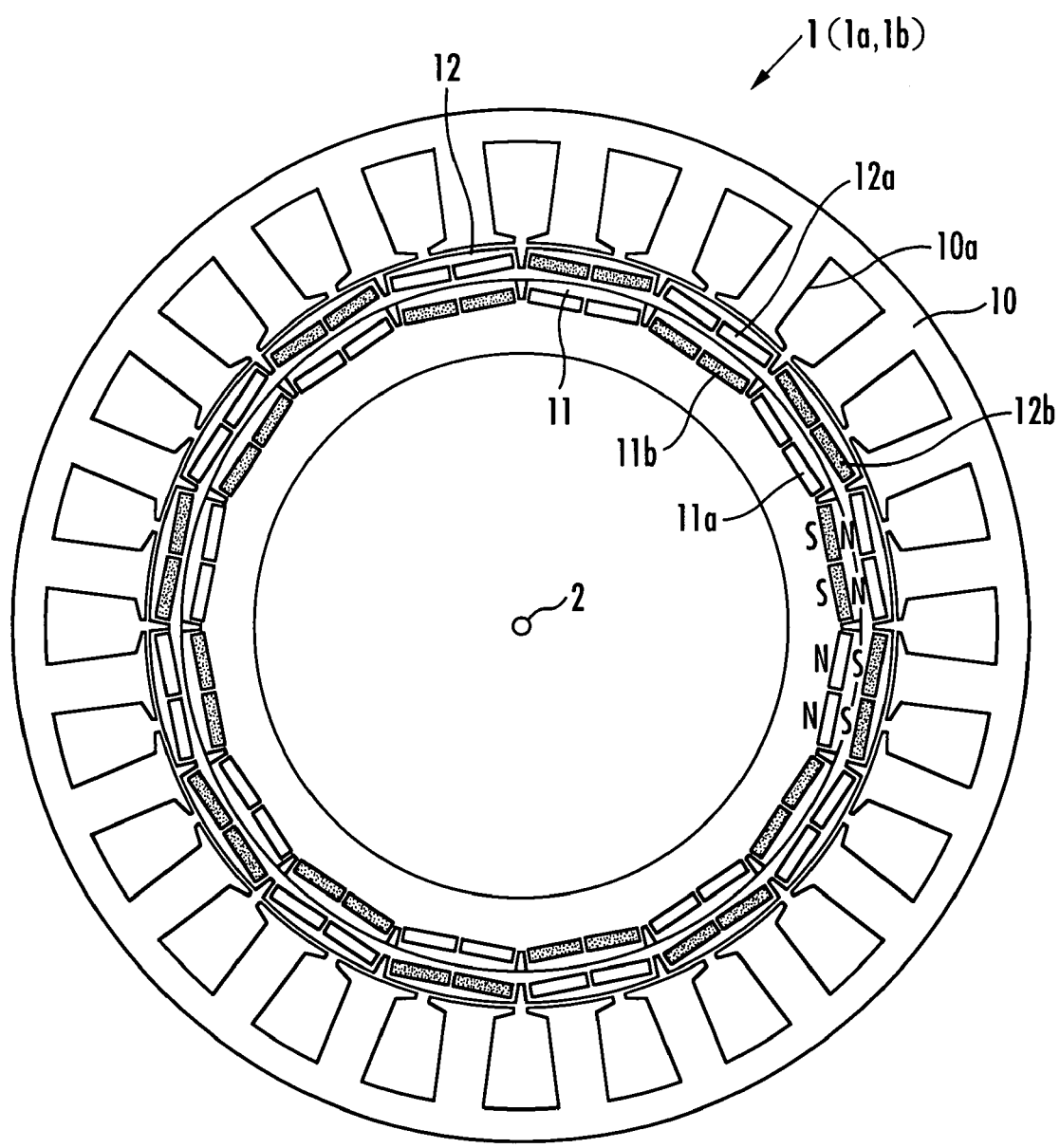
FIG. 2 is a configuration diagram of a DC brushless motor provided with a double-rotor shown in FIG. 1.
Figure 3:
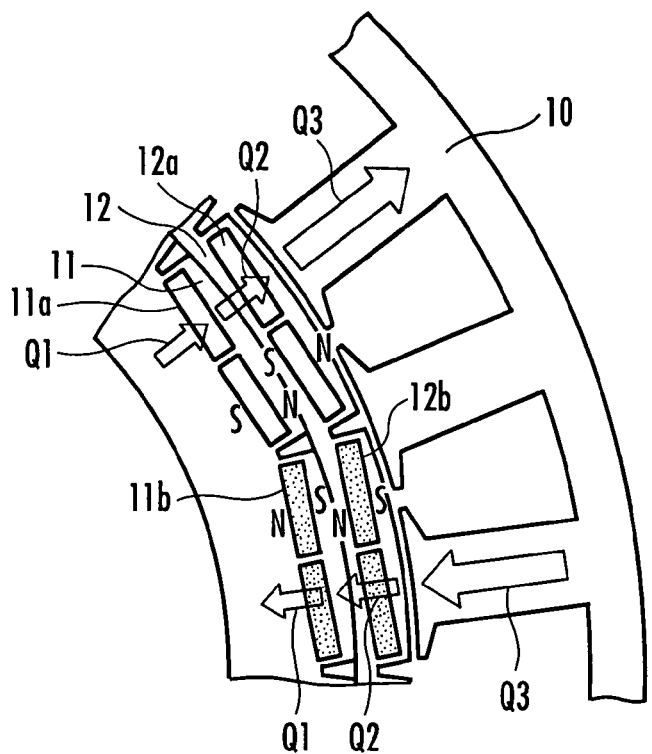
FIGS. 3(a) and 3(b) are explanatory diagrams of advantages obtained by changing a phase difference between an outer rotor and an inner rotor.
Figure 3:
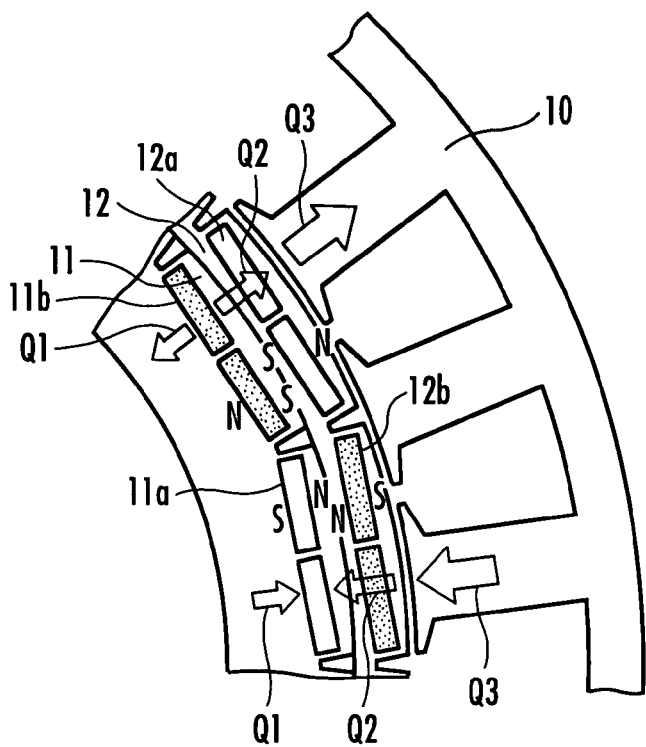
Figure 4:
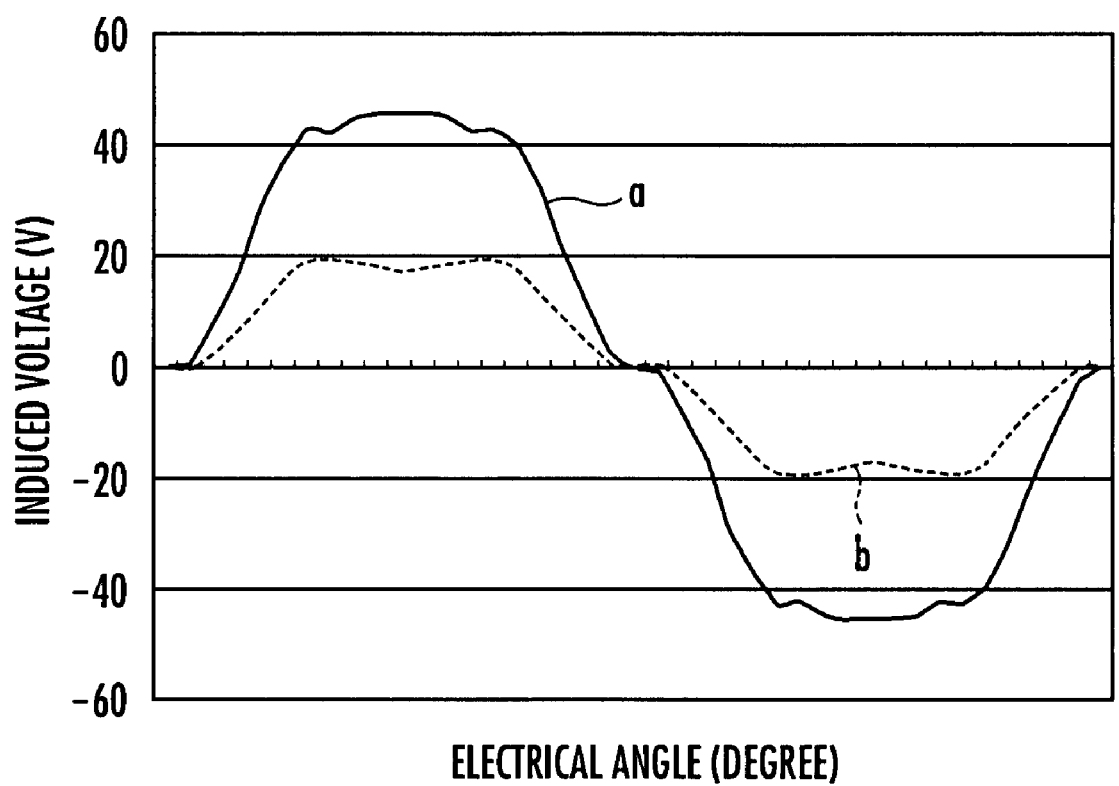
FIG. 4 is an explanatory diagram of the advantages provided by changing the phase difference between the outer rotor and the inner rotor.
Figure 5:
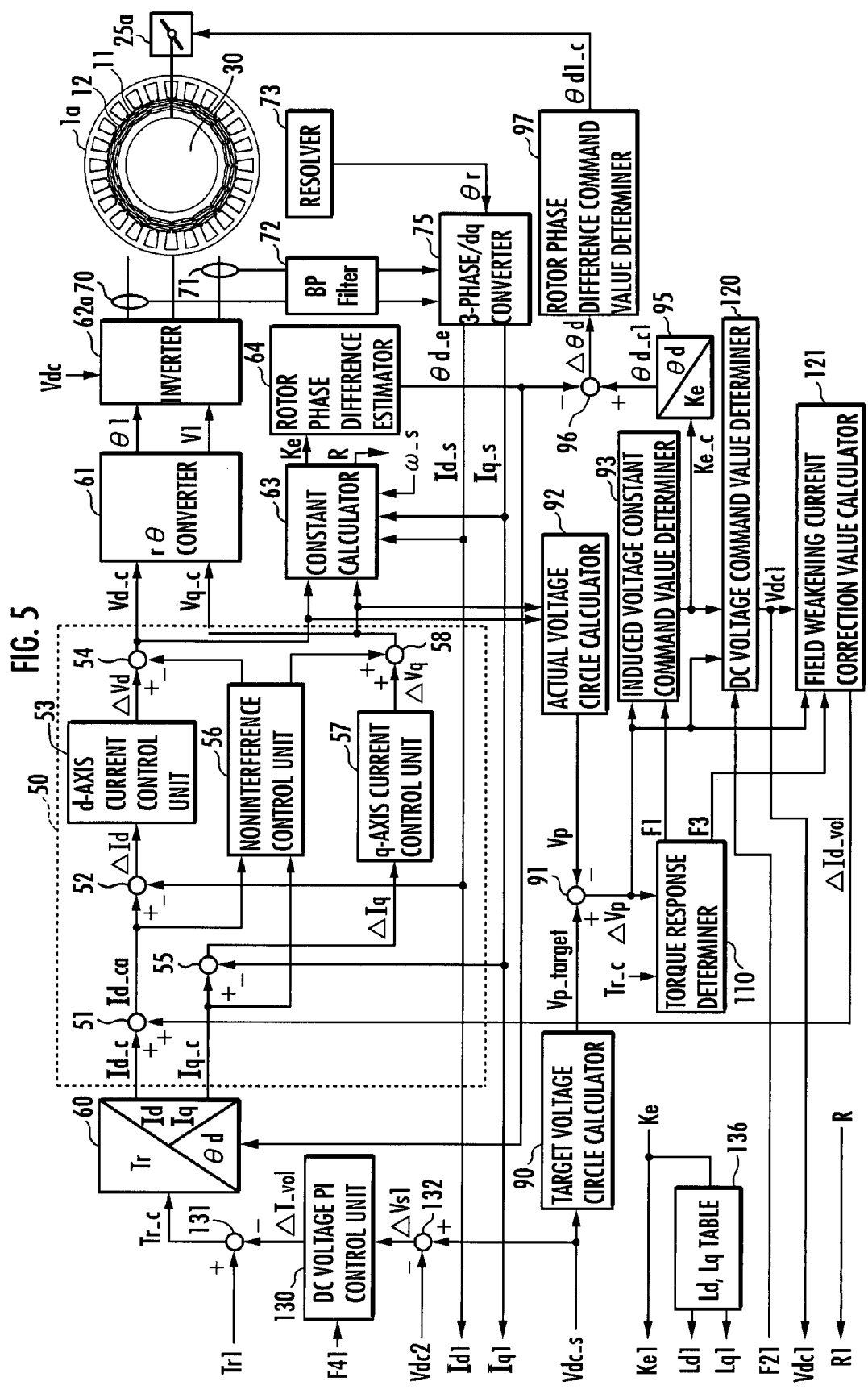
FIG. 5 is a configuration diagram centering around a first motor controller shown in FIG. 1.
Figure 6:
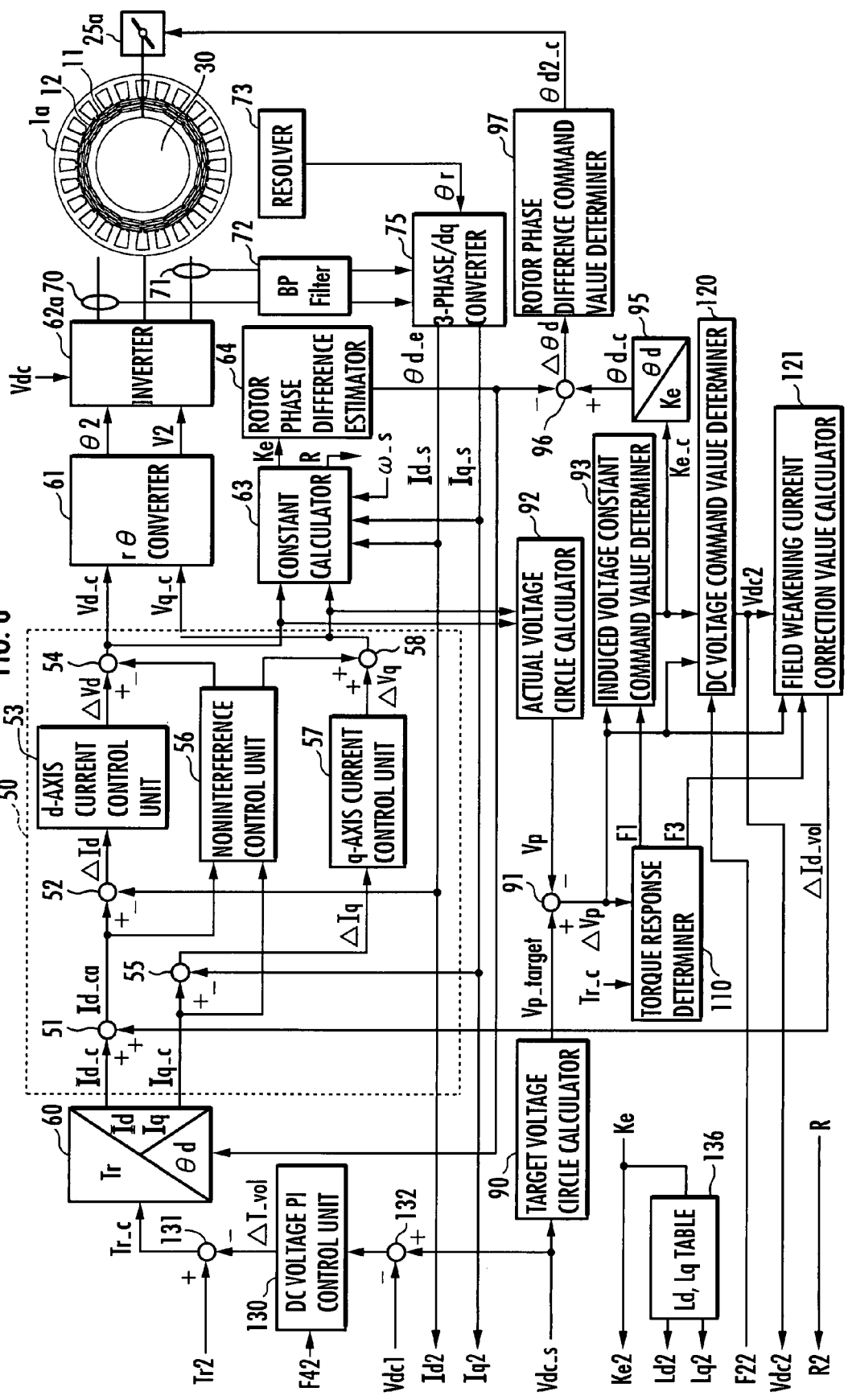
FIG. 6 is a configuration diagram centering around a second motor controller shown in FIG. 1.
Figure 7:
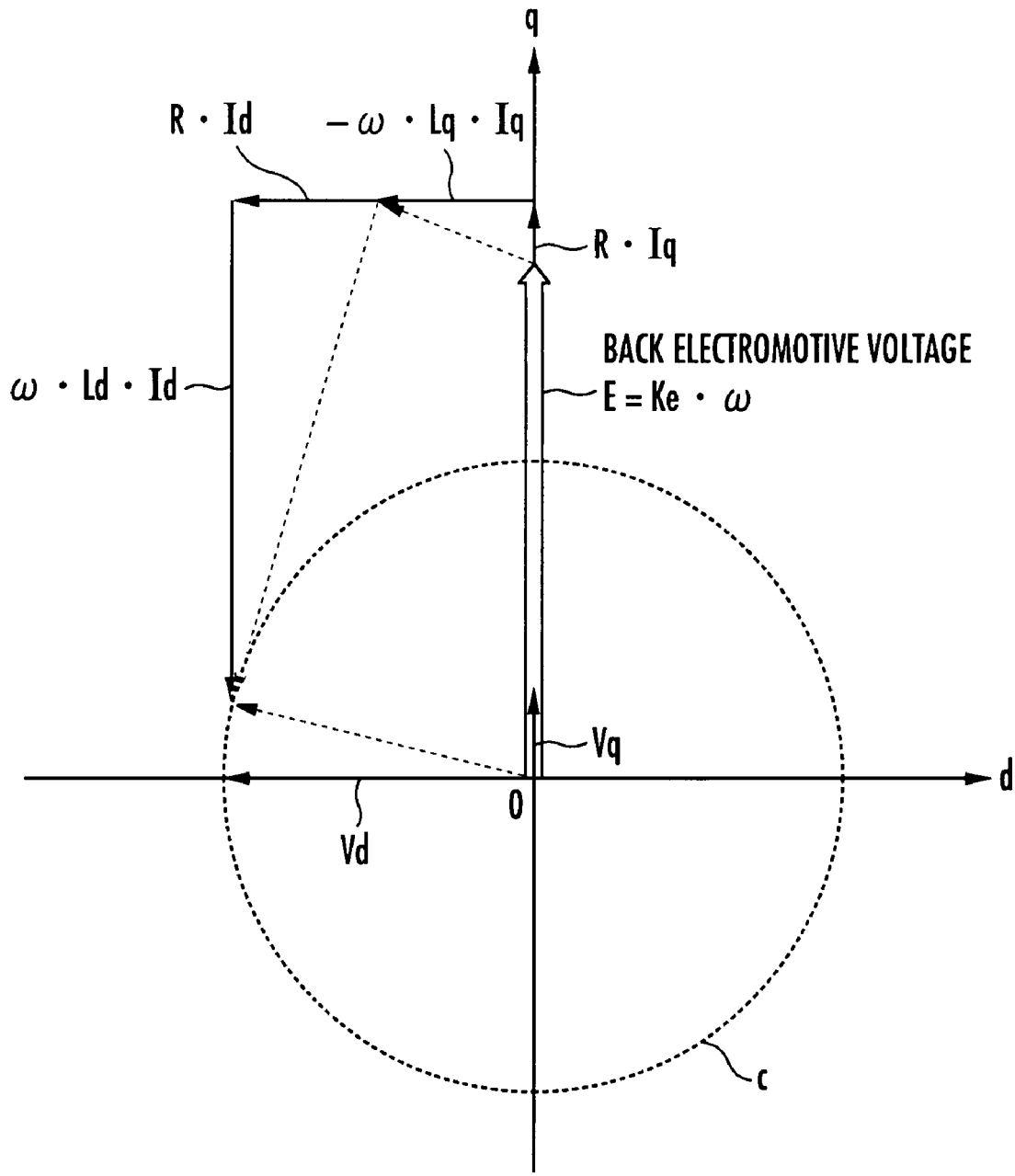
FIG. 7 is a voltage vector diagram in a dq coordinate system.
Figure 8:
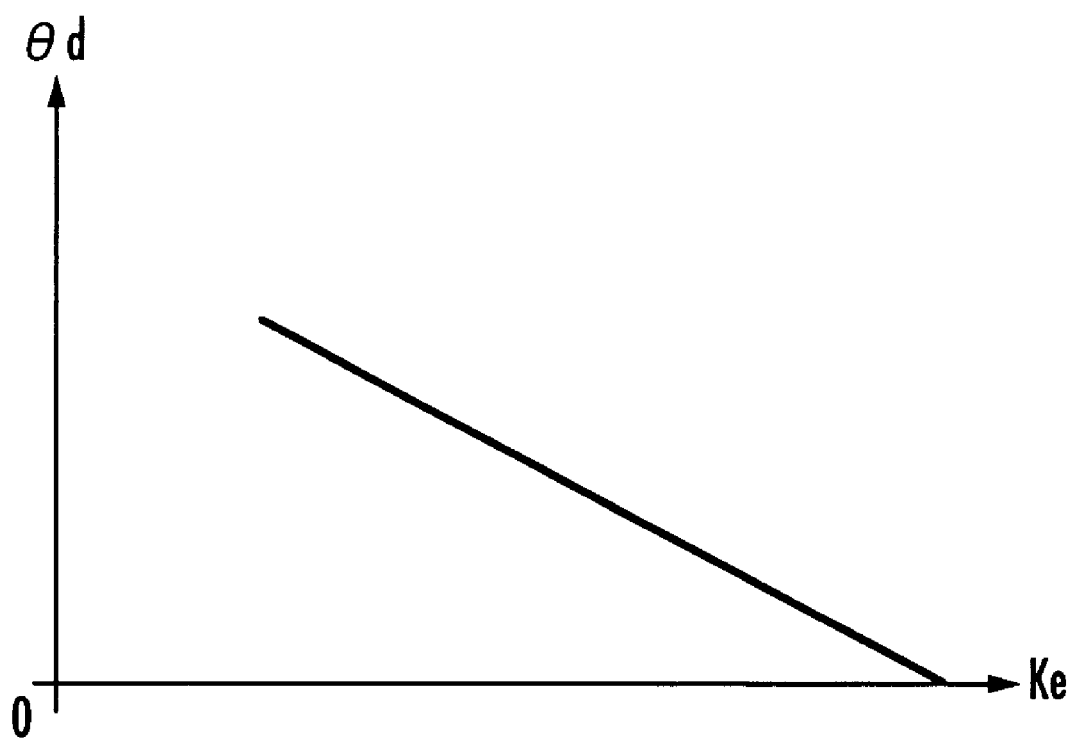
FIG. 8 is an explanatory diagram of a map for determining a rotor phase difference from an induced voltage constant.
Figure 9:
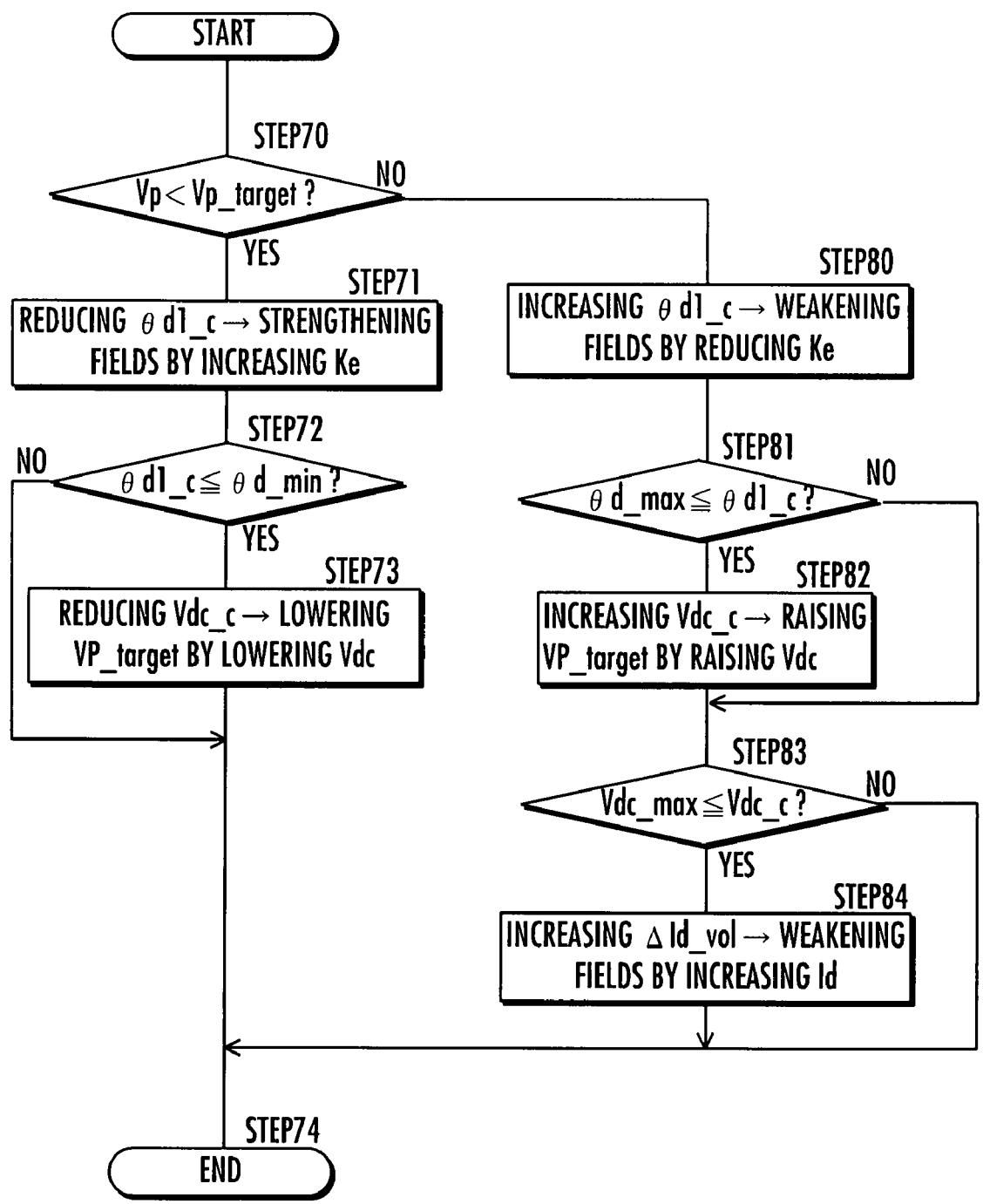
FIG. 9 is a flowchart of processing for bringing a resultant vector of voltages across the terminals of the armatures of individual phases of a motor close to a target voltage circle.
Figure 10:
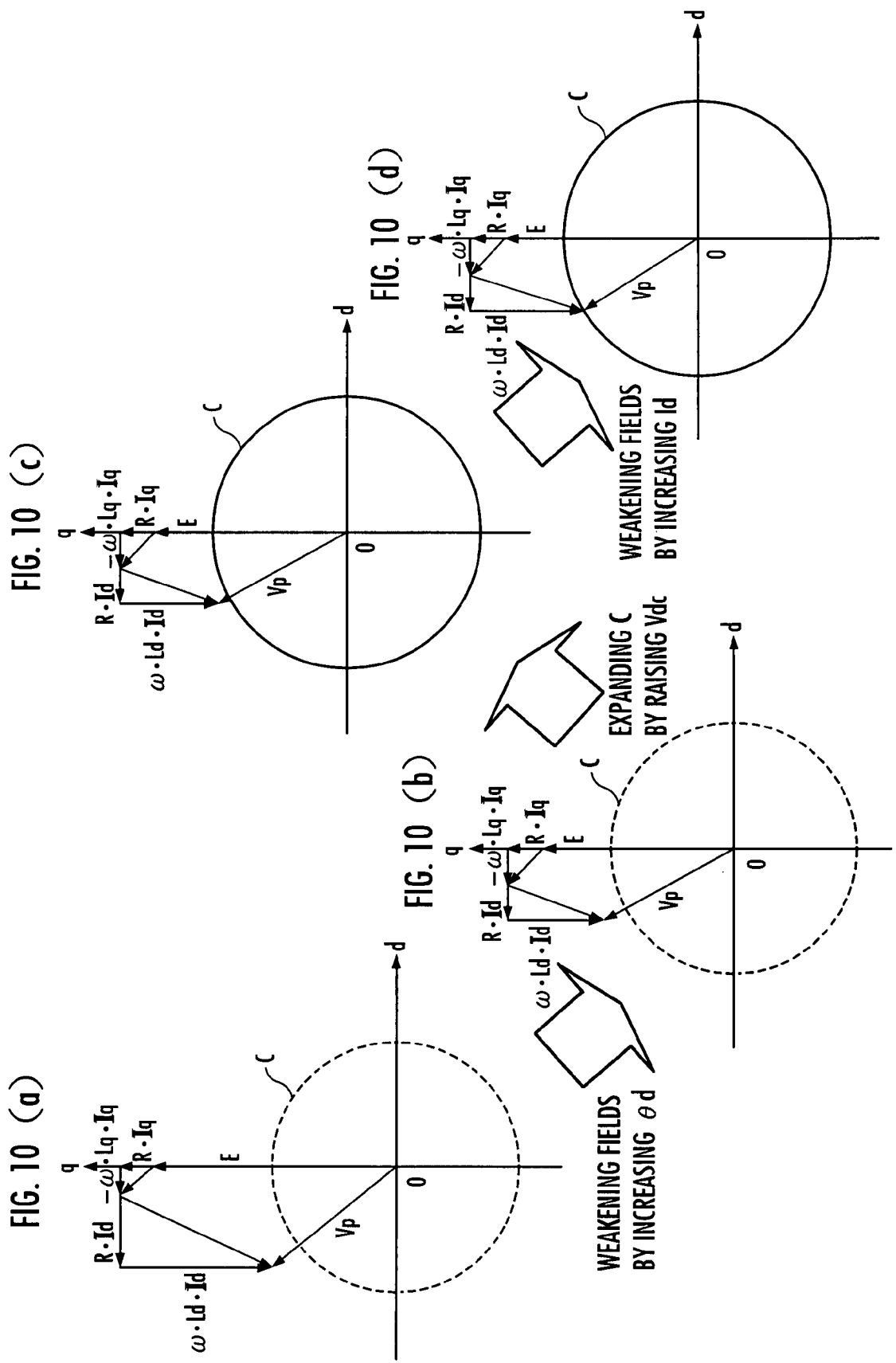
FIGS. 10(*a*), 10(*b*), 10(*c*), and 10(*d*) are explanatory diagrams of advantages obtained by weakening fields and raising a supply voltage.
Figure 11:
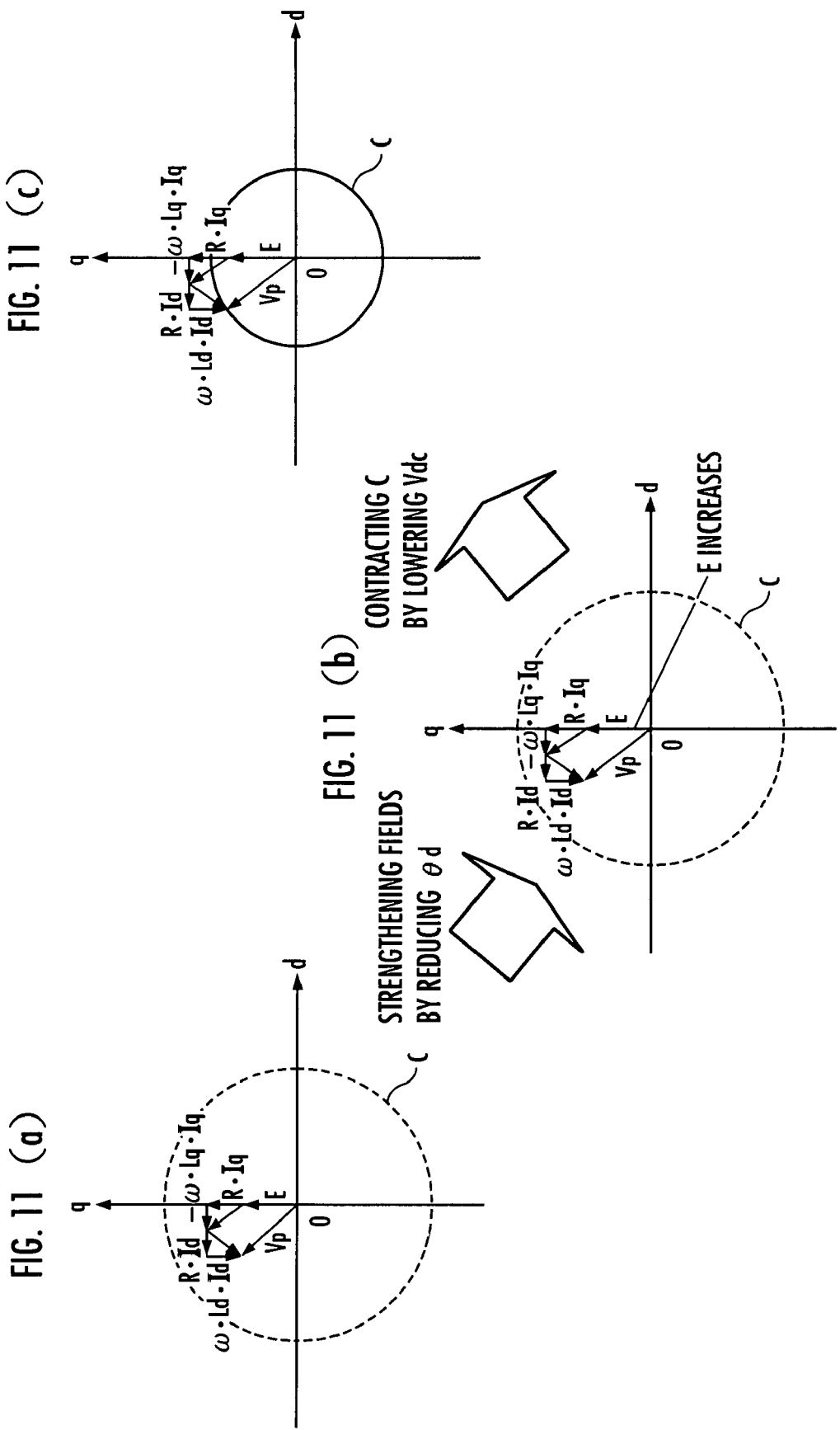
FIGS. 11(*a*), 11(*b*), and 11(*c*) are explanatory diagrams of advantages obtained by strengthening fields and lowering a supply voltage.
Figure 12:
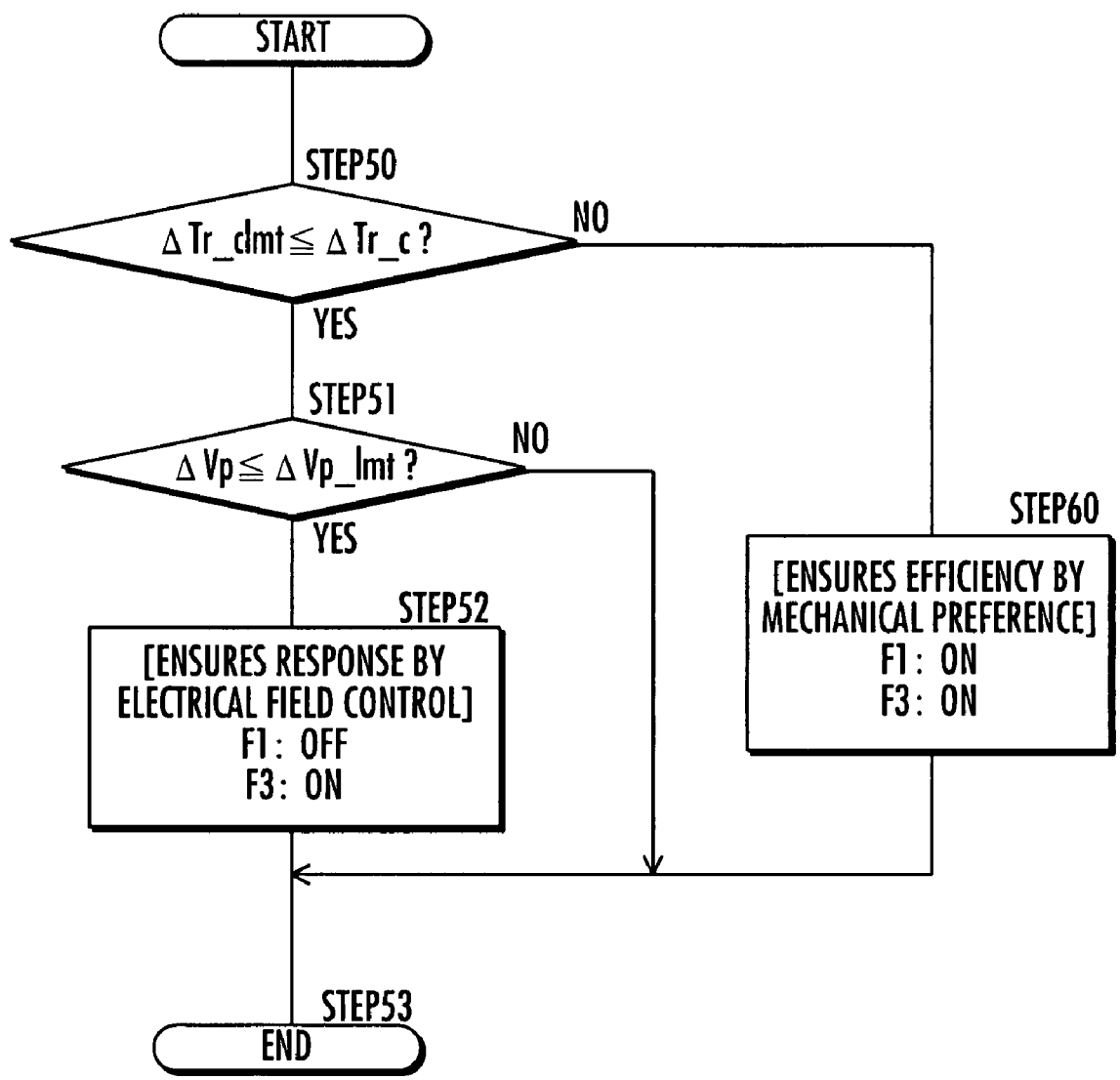
FIG. 12 is a flowchart of the processing for setting a flag by a torque response determiner.
Figure 13:
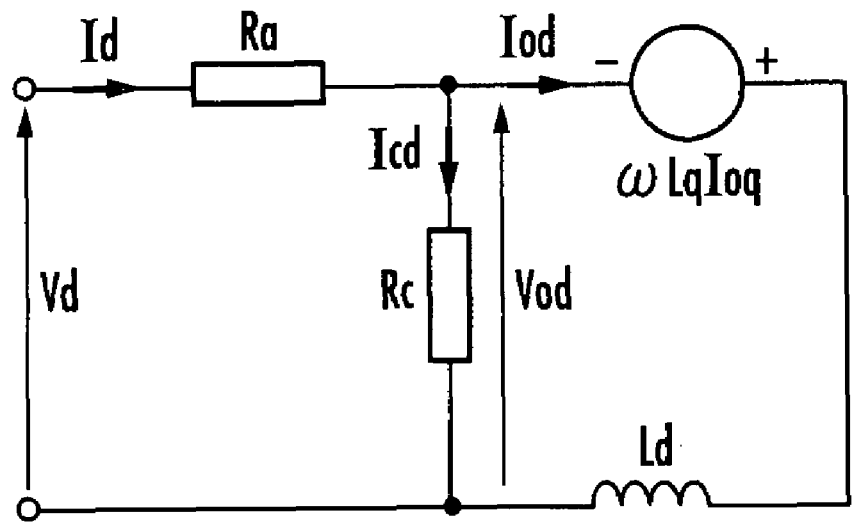
FIGS. 13(*a*) and 13(*b*) are explanatory diagrams of the processing for calculating a loss in a motor.
Figure 13:
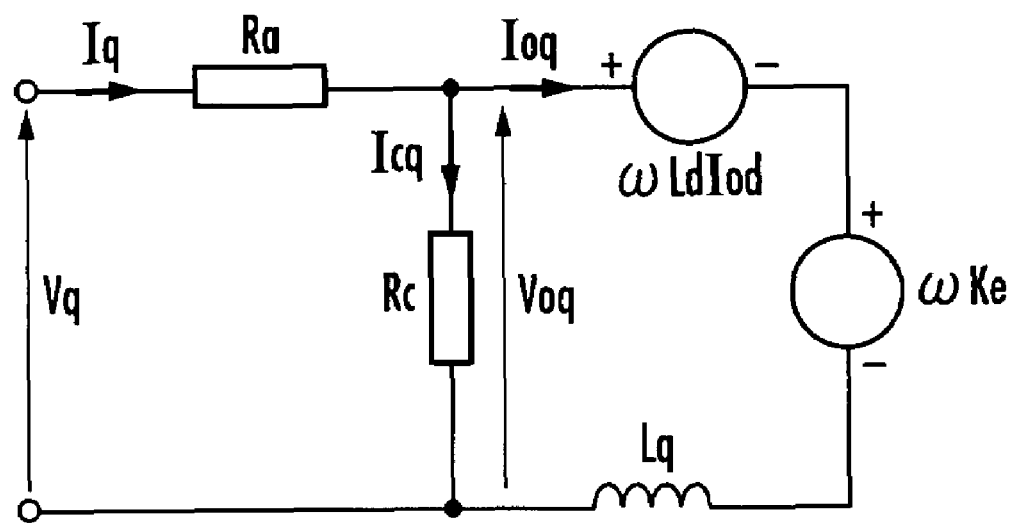
Figure 14:
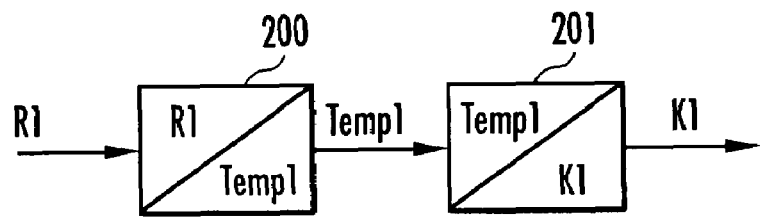
FIGS. 14(*a*), 14(*b*), and 14(*c*) are explanatory diagrams of processing for calculating a temperature protection coefficient of a motor.
Figure 14:
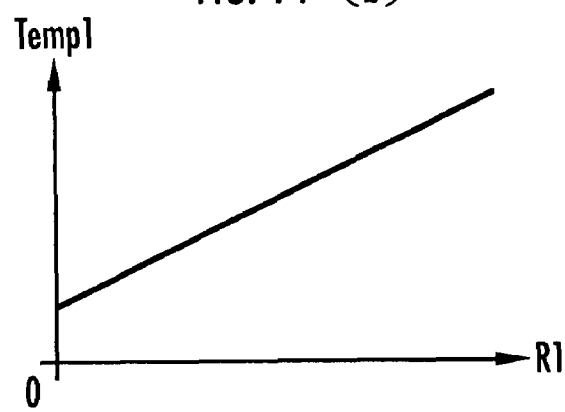
Figure 14:
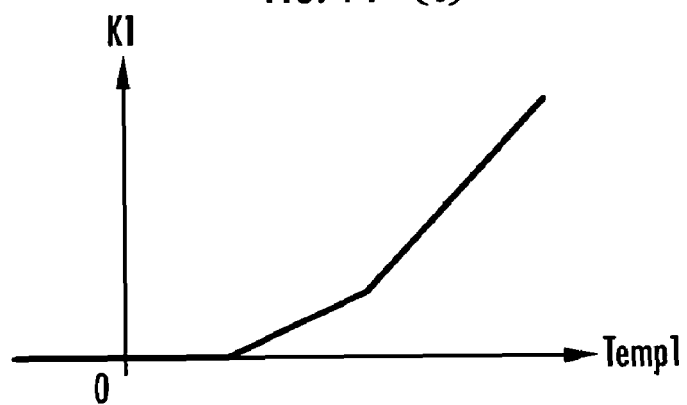
Figure 15:
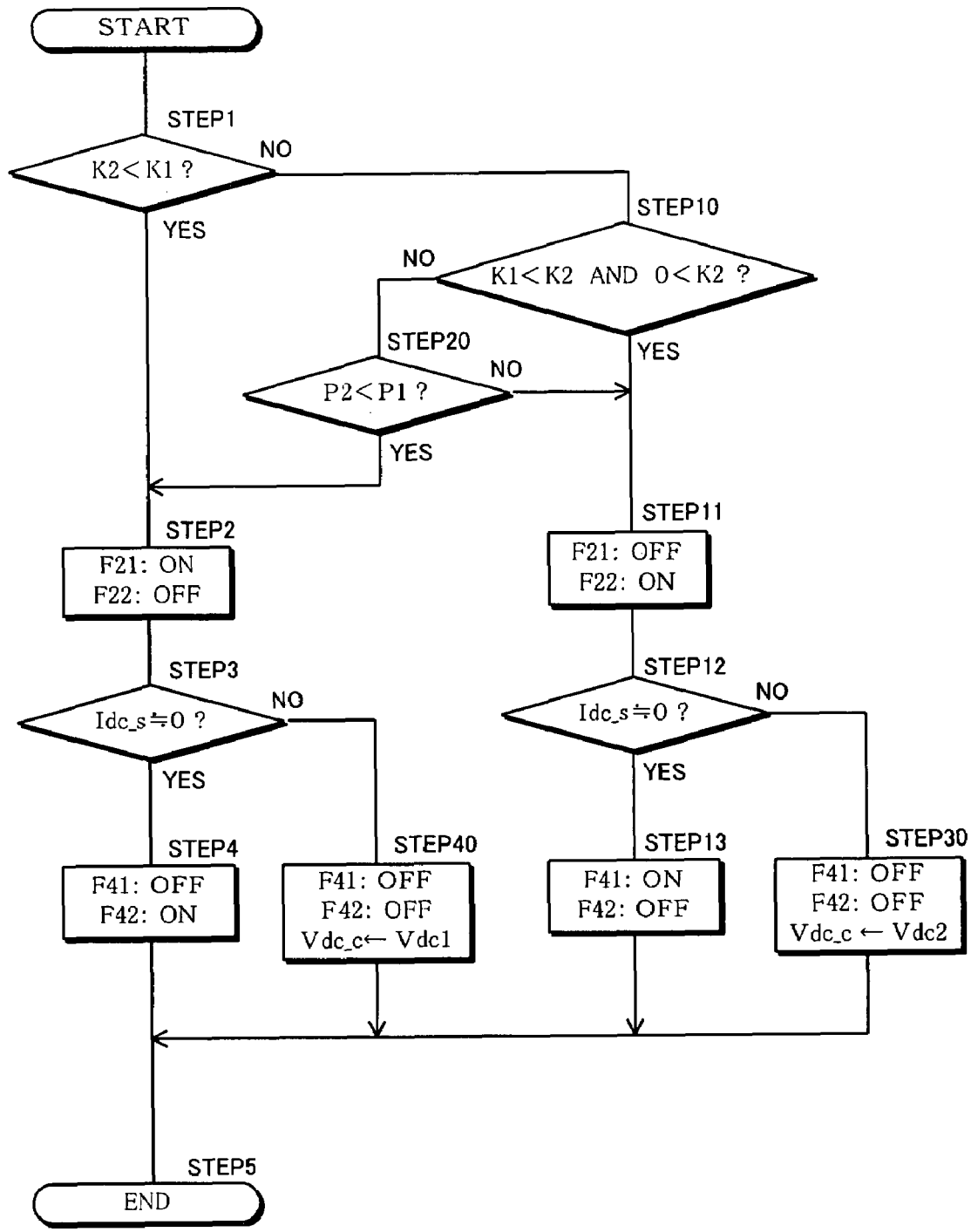
FIG. 15 is a flowchart of the processing for setting a flag by an operating condition determiner.
Figure 16:
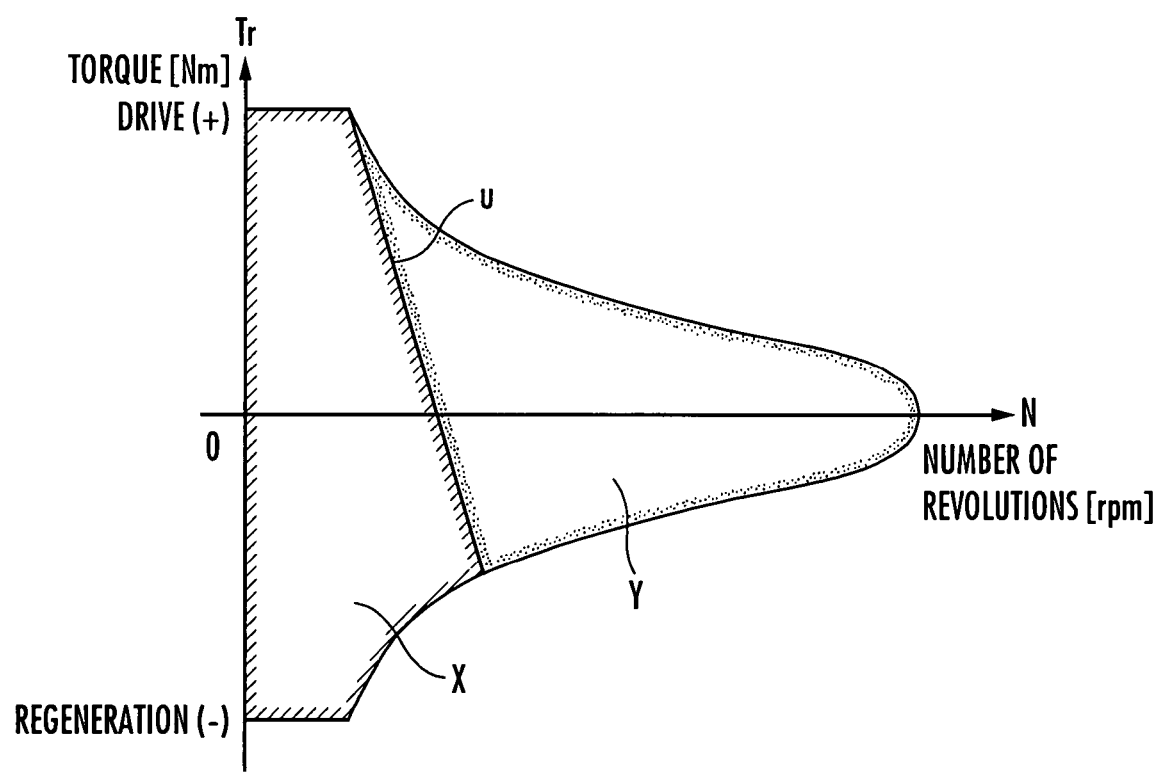
FIG. 16 is an explanatory diagram showing a range in which the fields in the motor are required to be weakened.

An embodiment of the present invention will be explained with reference to FIG. 1 to FIG. 15. FIG. 1 is an overall configuration diagram of a controller for a motor in accordance with the present invention, FIG. 2 is a configuration diagram of a DC brushless motor provided with a double-rotor shown in FIG. 1, FIG. 3 and FIG. 4 are explanatory diagrams of advantages obtained by changing a phase difference between an outer rotor and an inner rotor, FIG. 5 is a configuration diagram centering around a first motor controller shown in FIG. 1, FIG. 6 is a configuration diagram centering around a second motor controller shown in FIG. 1, FIG. 7 is a voltage vector diagram in a dq coordinate system, FIG. 8 is an explanatory diagram of a map for determining a rotor phase difference from an induced voltage constant, FIG. 9 is a flowchart of processing for bringing a resultant vector of voltages across the terminals of the armatures of individual phases of a motor close to a target voltage circle, FIG. 10 shows explanatory diagrams of advantages obtained by weakening fields and raising a supply voltage, FIG. 11 shows explanatory diagrams of advantages obtained by strengthening fields and lowering a supply voltage, FIG. 12 is a flowchart of the processing for setting a flag by a torque response determiner, FIG. 13 shows explanatory diagrams of the processing for calculating the estimated value of a loss in a motor, FIG. 14 shows explanatory diagrams of processing for calculating a temperature protection coefficient of a motor, and FIG. 15 is a flowchart of the processing for setting a flag by an operating condition determiner.

Referring to FIG. 1, a controller of a motor according to the present embodiment (hereinafter referred to as "the motor controller") is adapted to control the operations of a first motor 1*a* and a second motor 1*b*, which are DC brushless motors equipped with double rotors, and mounted in a hybrid vehicle provided with an engine 180. The first motor 1*a* is connected to the engine 180 through the intermediary of a motive energy distributor 181 that includes a transmission and drives front wheels 182 in cooperation with the engine 180. The second motor 1*b* drives rear wheels 183 through the intermediary of a clutch 184 that includes a transmission.

Each of the first motor 1*a* and the second motor 1*b* has an inner rotor 11 and an outer rotor 12 that have a plurality of permanent magnet type fields. The phase difference between the inner rotor 11 and the outer rotor 12 is changed by an actuator 25*a* in the first motor 1*a* and by an actuator 25*b* in the second motor 1*b*. The induced voltage constants of the first motor 1*a* and the second motor 1*b* can be changed by changing the phase difference between the inner rotor 11 and the outer rotor 12. The details of the configurations of the first motor 1*a* and the second motor 1*b* will be described hereinafter.

The first motor 1*a* is connected to an inverter 62*a* (corresponding to a drive circuit in the present invention), an AC drive voltage of three phases (U, V and W) being supplied thereto. Similarly, the second motor 1*b* is connected to an inverter 62*b* (corresponding to a drive circuit in the present invention), a three-phase AC drive voltage being supplied thereto. The inverter 62*a* and the inverter 62*b* are connected to a bidirectional DC/DC converter 151 (corresponding to an output voltage changer in the present invention). An output voltage of a battery 150 (corresponding to a DC power source and a storage battery in the present invention) is raised/lowered by the DC/DC converter 151 and supplied to the inverter 62*a* and the inverter 62*b*.

The first motor 1*a* and the second motor 1*b* operate also as generators, and the regenerative electric power produced when the vehicle decelerates and the electric power produced due to the rotative drive by the engine 180 are supplied to the battery 150 through the intermediary of the inverters 62*a*, 62*b* and the DC/DC converter 151, thereby charging the battery 150. If the second motor 1*b* is operated while the first motor 1*a* is operating as a generator, then the electric power generated by the first motor 1*a* is supplied to the inverter 62*b* through the intermediary of the inverter 62*a*.

The motor controller is equipped with a first motor control unit 170*a* that controls the energization amount of the first motor 1*a* such that a target torque Tr1 of the first motor 1*a* determined according to an operation by a driver or a driving condition of the vehicle is output, a second motor control unit 170*b* that controls the energization amount of the second motor 1*b* such that a target torque Tr2 of the second motor 1*b* determined according to an operation by the driver or a driving condition of the vehicle is output, and a DC voltage control unit 160 that controls an output voltage of the DC/DC converter 151 such that a total loss in the first motor 1*a* and the second motor 1*b* is reduced.

The first motor control unit 170*a* and the second motor control unit 170*b* handle the first motor 1*a* and the second motor 1*b*, respectively, by converting them into equivalent circuits based on a two-phase DC rotation coordinate system having the direction of a field indicated by d-axis and the direction orthogonal to the d-axis indicated by q-axis.

Further, the first motor control unit 170*a* outputs a rotor angle command value θ1 and a voltage magnitude command value V1 for changing the energization amount of the first motor 1*a* to the inverter 62*a*, and also outputs a command value θd1_c of a phase difference between double rotors to the actuator 25*a*. Further, the first motor control unit 170*a* outputs a command value Vdc1 of an output voltage of the DC/DC converter 151 for reducing the loss in the first motor 1*a*, an inductance Ld1 of an armature on the d-axis side (hereinafter referred to as the d-axis armature) and an inductance Lq1 of an armature on the q-axis side (hereinafter referred to as the q-axis armature) of the first motor 1*a*, a detection value Id1 of current flowing into the d-axis armature (hereinafter referred to as the d-axis current) and a detection value Iq1 of current flowing into the q-axis armature (hereinafter referred to as the q-axis current), an induced voltage constant Ke1, and resistance R1 of the d-axis armature and the q-axis armature to the DC voltage control unit 160.

Similarly, the second motor control unit 170b outputs a rotor angle command value θ2 for changing the energization amount of the second motor 1b and a voltage magnitude command value V2 to the inverter 62b, and also outputs a command value θd2_c of a phase difference between double rotors to the actuator 25b. Further, the second motor control unit 170b outputs a command value Vdc2 of an output voltage of the DC/DC converter 151 for reducing the loss in the second motor 1b, an inductance Ld2 of the d-axis armature and an inductance Lq2 of the q-axis armature of the second motor 1b, a detection value Id2 of the d-axis current and a detection value Iq2 of the q-axis current, an induced voltage constant Ke2, and resistance R2 of the d-axis armature and the q-axis armature to the DC voltage control unit 160.

The DC voltage control unit 160 is equipped with a first motor operating condition calculator 161 that calculates an estimated value P1 of a loss occurring in the first motor 1a and a temperature protection coefficient K1, a second motor operating condition calculator 162 that calculates an estimated value P2 of a loss occurring in the second motor 1b and a temperature protection coefficient K2, and an operating condition determiner 163 which turns ON/OFF flags F21 and F41 for setting the operating condition of the first motor 1a and flags F22 and F42 for setting the operating condition of the second motor 1b on the basis of the loss P1 and the temperature protection coefficient K1 of the first motor 1a and the loss P2 and the temperature protection coefficient K2 of the second motor 1b and also determines either Vdc1 or Vdc2 to be the command value Vdc_c of an output voltage of the DC/DC converter 151.

Further, the detection value Idc_s of input/output current of the DC/DC converter 151 provided by a current sensor 152 and the detection value Vdc_s of an output voltage of the DC/DC converter 151 provided by a voltage sensor 153 are input to the DC voltage control unit 160.

The operating condition determiner 163, the first motor control unit 170a, and the second motor control unit 170b constitute the voltage difference reduction controlling means in the present invention. The step in which a difference between a phase voltage Vp and a target voltage Vp_target, which will be discussed hereinafter, is reduced by the operating condition determiner 163, the first motor control unit 170a, and the second motor control unit 170b corresponds to the voltage difference reduction step in the present invention.

Further, the construction for calculating the estimated value P1 of loss in the first motor 1a by the first motor operating condition calculator 161 and the construction for calculating the estimated value P2 of loss in the second motor 1b by the second motor operating condition calculator 162 correspond to the motor loss estimating means in the present invention. A step for calculating the estimated value P1 of loss in the first motor 1a by the first motor operating condition calculator 161 and a step for calculating the estimated value P2 of loss in the second motor 1b by the second motor operating condition calculator 162 correspond to the motor loss estimation step in the present invention.

Further, the construction for calculating the temperature protection coefficient K1 of the first motor 1a by the first motor operating condition calculator 161 and the construction for calculating the temperature protection coefficient K2 of the second motor 1b by the second motor operating condition calculator 162 correspond to the motor temperature detecting means in the present invention.

Referring now to FIG. 2 to FIG. 4, the constructions of the first motor 1a and the second motor 1b will be explained. The first motor 1a and the second motor 1b share the same construction, so that they will be explained as a motor 1 herein. As shown in FIG. 2, the motor 1 is a DC brushless motor equipped with an inner rotor 11 having fields of permanent magnets 11a and 11b disposed at equal intervals in the circumferential direction, an outer rotor 12 having fields of permanent magnets 12a and 12b disposed at equal intervals in the circumferential direction, and a stator 10 having an armature 10a for producing a rotary field in relation to the inner rotor 11 and the outer rotor 12. One of the inner rotor 11 and the outer rotor 12 corresponds to the first rotor in the present invention and the other corresponds to the second rotor in the present invention.

The inner rotor 11 and the outer rotor 12 are concentrically disposed such that the rotating shafts thereof are both coaxial with a rotating shaft 2 of the motor 1. In the inner rotor 11, the permanent magnets 11a having their north poles facing the rotating shaft 2 and permanent magnets 11b having their south poles facing the rotating shaft 2 are alternately disposed. Similarly, in the outer rotor 12, the permanent magnets 12a having their north poles facing the rotating shaft 2 and the permanent magnets 12b having their south poles facing the rotating shaft 2 are alternately disposed.

The motor 1 is equipped with a relative rotary mechanism (not shown), such as a planetary gear mechanism, to change a rotor phase difference as the phase difference between the outer rotor 12 and the inner rotor 11. The rotor phase difference can be changed by actuating the relative rotary mechanism by actuators 25a and 25b (refer to FIG. 1). As the actuators 25a and 25b, for example, motors or hydraulic devices may be used.

The phase difference between the outer rotor 12 and the inner rotor 11 can be changed toward an advanced angle or a delayed angle in a range of at least 180 degrees in terms of electrical angle. The condition of the motor 1 can be set, as appropriate, between a field-weakening mode wherein the permanent magnets 12a and 12b of the outer rotor 12 and the permanent magnets 11a and 11b of the inner rotor 11 are disposed with the same poles thereof opposing each other and a field-strengthening mode wherein the permanent magnets 12a and 12b of the outer rotor 12 and the permanent magnets 11a and 11b of the inner rotor 11 are disposed with opposite poles thereof opposing each other.

FIG. 3(a) shows the field-strengthening mode. The directions of magnetic fluxes Q2 of the permanent magnets 12a and 12b of the outer rotor 12 and the directions of magnet fluxes Q1 of the permanent magnets 11a and 11b of the inner rotor 11 are the same, leading to a large composite magnetic fluxes Q3. Meanwhile, FIG. 3(b) shows the field-weakening mode. The directions of the magnetic fluxes Q2 of the permanent magnets 12a and 12b of the outer rotor 12 and the directions of the magnet fluxes Q1 of the permanent magnets 11a and 11b of the inner rotor 11 are opposite to each other, causing the composite magnetic fluxes Q3 to be smaller.

FIG. 4 shows a graph comparing induced voltages produced in the armature of the stator 10 when the motor 1 is run at a predetermined number of revolutions in the mode shown in FIG. 3(a) and in the mode shown in FIG. 3(b), respectively, the axis of ordinates indicating induced voltage (V) and the axis of abscissas indicating electrical angle (degrees). In the graph, "a" denotes the mode shown in FIG. 3(a)(the field strengthening mode), while "b" denotes the mode shown in FIG. 3(b)(the field weakening mode). FIG. 4 shows that changing the phase difference between the outer rotor 12 and the inner rotor 11 causes a significant change in an induced voltage that is generated.

Thus, the induced voltage constant Ke of the motor 1 can be changed by increasing or decreasing the magnetic fluxes of the fields by changing the phase difference between the outer rotor 12 and the inner rotor 11. This makes it possible to expand an operative range relative to outputs and the numbers of revolutions of the motor 1, as compared with a case where the induced voltage constant Ke is fixed. Moreover, the efficiency of the motor 1 can be enhanced, because the loss in the motor 1 reduces, as compared with a case where the field weakening control is conducted by energizing the armature disposed on the d-axis (field axis) by d-q coordinate conversion.

Referring now to FIG. 5, the construction of the first motor control unit 170a will be explained. The first motor control unit 170a includes a current command value determiner 60 that determines a d-axis current command value Id_c and a q-axis current command value Iq_c on the basis of a torque command value Tr_c and an estimated value θd_e of a phase difference between the outer rotor 12 and the inner rotor 11 of the first motor 1a (hereinafter referred to as the rotor phase difference), a three-phase/dq converter 75 that calculates the d-axis current detection value Id_s and a q-axis current detection value Iq_s by three-phase/dq conversion on the basis of current detection signals which are detected by current sensors 70 and 71 and from which unwanted components have been removed by a band-pass filter 72 and a rotor angle θr of the outer rotor 12 detected by a resolver 73, an energization control unit 50 which determines a command value Vd_c of a voltage between the terminals of the d-axis armature (hereinafter referred to as the d-axis voltage) and a command value Vq_c of a voltage between the terminals of the q-axis armature (hereinafter referred to as the q-axis voltage) such that a difference ΔId between the command value Id_c and the detection value Id_s of the d-axis current and a difference ΔIq between the command value Iq_c and the detection value Iq_s of the q-axis current are reduced, and an rθ converter 61 which converts the command value Vd_c of the d-axis voltage and the command value Vq_c of the q-axis voltage into components of a magnitude V1 and an angle θ and outputs the results to the inverter 62a.

The energization control unit 50 includes an adder 51 for adding a correction value ΔId_vol to the d-axis current command value Id_c, a subtractor 52 for calculating a difference ΔId between the d-axis current command value Id_ca to which the correction value ΔId_vol has been added and a detection value Id_s of the d-axis current, a d-axis current control unit 53 for calculating a d-axis difference voltage ΔVd for producing the difference ΔId, a noninterference control unit 56 for calculating a component (noninterference component) for cancelling the influences of velocity electromotive forces, which interfere with each other between the d-axis and the q-axis, on the basis of the d-axis current command value Id_c and the q-axis current command value Iq_c, a subtractor 54 for subtracting the noninterference component calculated by the noninterference control unit 56 from the d-axis difference voltage ΔVd, a subtractor 55 for calculating the difference ΔIq between the command value Iq_c and the detection value Iq_s of the q-axis current, a q-axis current control unit 57 for calculating a q-axis difference voltage ΔVq for producing the difference ΔIq, and an adder 58 for adding the noninterference component to the q-axis difference voltage ΔVq.

The first motor control unit 170a includes a constant calculator 63 which calculates the induced voltage constant Ke and the resistance R of the d-axis armature and the q-axis armature of the first motor 1a on the basis of the d-axis voltage command value Vd_c, the q-axis voltage command value Vq_c, the d-axis current detection value Id_s, the q-axis current detection value Iq_s, and an angular velocity detection value ω_s (detected by an angular velocity detector, which is not shown) of the first motor 1a, a rotor phase difference estimator 64 which determines the estimated value θd_e of a rotor phase difference on the basis of the induced voltage constant Ke, a target voltage circle calculator 90 which calculates a target voltage circle radius Vp_target (corresponding to the first target voltage in the present invention), which will be discussed hereinafter, from the detection value Vdc_s of an output voltage of the DC/DC converter 151, an actual voltage circle calculator 92 which calculates a radius Vp of an actual voltage circle (corresponding to a phase voltage in the present invention), which will be discussed later, from the d-axis voltage command value Vd_c and the q-axis voltage command value Vq_c, an induced voltage constant command value determiner 93 which determines a command value Ke_c of an induced voltage constant on the basis of a difference ΔVp between Vp_target and Vp, a rotor phase difference acquirer 95 which acquires a rotor phase difference θd_c1 corresponding to the command value Ke_c of the induced voltage constant, and a rotor phase difference command value determiner 97 which determines a command value θd1_c of the rotor phase difference on the basis of a difference Δθd between the θd_c1 and the estimated value θd_e of the rotor phase difference.

The first motor control unit 170a further includes a torque response determiner 110 which turns ON/OFF flags F1 and F3 that determine the actuating timings of the induced voltage constant command value determiner 93 and a field weakening current correction value calculator 121 on the basis of the torque command value Tr_c and ΔVp, a DC voltage command value determiner 120 which determines and output a command value Vdc1 of an output voltage of the DC/DC converter 151 on the basis of the difference ΔVp between Vp_target and Vp and the command value Ke_c of the induced voltage constant when the flag F21 is ON, and the field weakening current correction value calculator 121 which calculates a correction value ΔId_vol of field weakening current on the basis of the command value Vdc1 of the output voltage and ΔVp when the flag F3 is ON.

The first motor control unit 170a further includes a DC voltage PI control unit 130 which calculates a torque command correction value ΔT_vol by carrying out proportional integration (PI) control on a difference Δvs1 between the detection value Vdc_s of the output voltage Vdc of the DC/DC converter 151 calculated by a subtracter 132 and a command value Vdc2 of a supply voltage output from the second motor control unit 170b, and a subtracter 131 which calculates the torque command value Tr_c by subtracting the correction value ΔT_vol from the torque command value Tr1.

The first motor control unit 170a further includes a Ld, Lq map 136 for determining an inductance Ld1 of the d-axis armature and an inductance Lq1 of the q-axis armature from the induced voltage constant Ke. Further, the first motor control unit 170a outputs, to the DC voltage control unit 160, the d-axis current detection value Id_s as Id1, the q-axis current detection value Iq_s as Iq1, the R calculated by the constant calculator as R1, Ke as Ke1, the inductance Ld of the d-axis armature determined by the Ld, Lq map 136 as Ld1, and the inductance Lq of the q-axis armature determined by the Ld, Lp map 136 as Lq1. The first motor control unit 170a also outputs the DC voltage command value Vdc1 calculated by the DC voltage command value determiner 120 to the second motor control unit 170b.

Referring now to FIG. 6, the construction of the second motor control unit 170b will be explained. The construction of the second motor control unit 170b is the same as that of the first motor control unit 170a except for parameters to be input or output. The like components as those of the first motor control unit 170a shown in FIG. 5 will be assigned like reference numerals and the explanation thereof will be omitted.

In the second motor control unit 170b, the d-axis voltage command value Vd_c and the q-axis voltage command value Vq_c are converted into the components of the magnitude V2 and the angle θ by the rθ converter 61 and the converted components are output to the inverter 62b. The rotor phase difference command value determiner 97 determines the rotor phase difference command value θd2_c of the second motor 1b and outputs the determined command value to the actuator 25b.

In the second motor control unit 170b, when the flag F22 is ON, the DC voltage command value determiner 120 outputs the command value Vdc2 of an output voltage of the DC/DC converter 151. The subtracter 132 calculates a difference ΔVs2 between the detection value Vdc_s of an output voltage of the DC/DC converter 151 and a specified value Vdc1 output from the first motor control unit 170a. Further, when the flag F42 is ON, the torque command correction value ΔT_vol calculated by carrying out the PI control on the difference ΔVs2 by the DC voltage PI control unit 130 is subtracted from the torque command value Tr2 of the second motor 1b by the subtractor 131.

Then, the second motor control unit 170b outputs, to the DC voltage control unit 160, the d-axis current detection value Id_s as Id2, the q-axis current detection value Iq_s as Iq2, the R calculated by the constant calculator as R2, Ke as Ke2, and the inductance Ld of the d-axis armature determined by the Ld, Lq map 136 as Ld2, and the q-axis armature inductance Lq determined by the Ld, Lq map 136 as Lq2. The second motor control unit 170b also outputs the DC voltage command value Vdc2 calculated by the DC voltage command value determiner 120 to the first motor control unit 170a.

FIG. 7 shows a relationship between current and voltage in the dq coordinate system, the axis of ordinates being set to the q-axis (torque axis) and the axis of abscissas being set to the d-axis (field axis). In FIG. 7, C denotes a target voltage circle whose radius Vp_target is calculated by the target voltage circle calculator 90. Vp_target is set to, for example, Vdc×0.5 or Vdc/6$^{1/2}$ based on sinusoidal modulation. Herein, the first motor 1a and the second motor 1b will be explained as the motor 1.

In FIG. 7, E denotes a back electromotive force produced in the q-axis armature due to the rotation of the motor 1, ω denotes an angular velocity of the motor 1, R denotes the resistance of the d-axis armature and the q-axis armature, Lq denotes an inductance of the q-axis armature, Ld denotes an inductance of the d-axis armature, Vd denotes a d-axis voltage, Vq denotes a q-axis voltage, Id denotes d-axis current, and Iq denotes q-axis current.

Here, the relationship defined by expression (1) given below holds for a component associated with the q-axis in FIG. 7, so that the induced voltage constant Ke can be calculated from expression (2) given below.

$$Ke \cdot \omega + R \cdot Iq = Vq - \omega \cdot Ld \cdot Id \quad (1)$$

where Ke: Induced voltage constant; ω: Angular velocity of motor; R: Resistance of q-axis armature and d-axis armature; Iq: q-axis current; Vq: Voltage across terminals of q-axis armature; Ld: Inductance of d-axis armature; and Id: d-axis current.

$$Ke = \frac{Vq - \omega \cdot Ld \cdot Id - R \cdot Iq}{\omega} \quad (2)$$

$$= \frac{Vq}{\omega} - Ld \cdot Id - \frac{Iq \cdot Vd}{\omega \cdot Id} - \frac{Iq^2 \cdot Lq}{Id}$$

Further, the relationship defined by expression (3) given below holds for a component associated with the d-axis in FIG. 7, so that the inductance Lq of the q-axis armature can be calculated from expression (4) given below.

$$Vd = R \cdot Id - \omega \cdot Lq \cdot Iq \quad (3)$$

where Vd: Voltage across terminals of d-axis armature; and Lq: Inductance of the q-axis armature.

$$R = \frac{Vd + \omega \cdot Lq \cdot Iq}{Id} \quad (4)$$

Hence, the constant calculators 63 of the first motor control unit 170a and the second motor control unit 170b substitute the q-axis command voltage Vq_c, the angular velocity detection value ω_s of the motor 1, the d-axis current detection value Id_s, and the q-axis current detection value Iq_s into Vq, ω, Id, and Iq, respectively, of the above expression (2) to calculate the induced voltage constant Ke. Further, the constant calculators 63 also substitute the d-axis voltage command value Vd_c, the angular velocity detection value ω_s of the motor 1, the q-axis current detection value Iq_s, and the d-axis current detection value Id_s into Vd, ω, Iq, and Id, respectively, of the above expression (4) to calculate the resistance R of the d-axis armature and the q-axis armature.

The inductance Ld of the d-axis armature and the inductance Lq of the q-axis armature change according to the magnitude of the induced voltage constant Ke of the motor 1, so that they are set on the basis of the induced voltage constant Ke according to a Ke/Ld, Lq correspondence map stored in a memory (not shown) beforehand.

Also stored in the memory is the data of a θd/Ke correspondence map shown in FIG. 8. The rotor phase difference estimator 64 applies the induced voltage constant Ke to the θd/Ke correspondence map to acquire the estimated value θd_e of the rotor phase difference θd.

Then, the current command value determiner 60 applies the torque command value Tr_c and the estimated value θd_e of the rotor phase difference to the correspondence maps of the Tr, θd/Id, Iq stored in the memory beforehand in order to acquire corresponding Id and Iq, and then determines the acquired Id and Iq as the d-axis current command value Id_c and the q-axis current command value Iq_c, respectively.

Subsequently, the first motor control unit 170a and the second motor control unit 170b carry out (a) supply voltage changing processing for changing the output voltage Vdc of the DC/DC converter 151, (b) rotor phase difference changing processing for changing Vp by changing the rotor phase difference θd, and (c) field weakening current changing processing for changing Vp by changing the d-axis current Id, such that the difference between the radius of a target voltage circle Vp_target (corresponding to a first target voltage in the present invention) calculated by the target voltage circle calculator 90 and the actual voltage circle radius Vp ($=\sqrt{(Vd\_c^2 + Vq\_c^2)}$, corresponding to a phase voltage in the present invention) calculated by the actual voltage circle calculator 92 is reduced and Vp traces on the circumference of the target voltage circle C.

Referring now to the flowchart shown in FIG. 9, the following will explain the control for reducing the difference between the phase voltage Vp and the target voltage radius Vp_target by the first motor control unit 170a. Here, the control over the first motor 1a by the first motor control unit 170a will be explained; the same control is carried out on the second motor 1b by the second motor control unit 170b.

In STEP70 of FIG. 9, the first motor control unit 170a determines whether the phase voltage Vp exceeds the target voltage Vp_target. If the phase voltage Vp exceeds the target voltage Vp_target, then the first motor control unit 170a branches to STEP80, or if the phase voltage Vp is lower than the target voltage Vp_target, then it proceeds to STEP71.

If the phase voltage Vp exceeds the target voltage Vp_target, then the processing of STEP80 to STEP84 is carried out to reduce the difference between the phase voltage Vp and the target voltage Vp_target to bring the phase voltage Vp close to the target voltage circle C (refer to FIG. 7). In STEP80, the first motor control unit 170a carries out the rotor phase difference changing processing to increase the command value θd1_c of the rotor phase difference θd of the first motor 1a. This reduces the rotor phase difference θd of the first motor 1a, causing the induced voltage constant Ke of the first motor 1a to decrease.

In the subsequent STEP81, if the command value θd_c of the rotor phase difference θd is θd_max (an upper limit of a variable range of θd) or more, then the procedure proceeds to STEP82, or if the θd_c is smaller than θd_max, then the procedure branches to STEP83. In STEP82, the first motor control unit 170a carries out the supply voltage changing processing to increase the command value Vdc_c of the output voltage Vdc of the DC/DC converter 151. Thus, the output voltage Vdc of the DC/DC converter 151 increases, and the target voltage Vp_target calculated by the target voltage circle calculator 90 increases.

In the next STEP83, the first motor control unit 170a determines whether the command value Vdc_c of the output voltage Vdc of the DC/DC converter 151 is the Vdc_max (an upper limit of an output voltage range of the DC/DC converter 151) or more. If the Vdc is the Vdc_max or more, then the procedure proceeds to STEP84, or if the Vdc is less than the Vdc_max, then the procedure branches to STEP74. In STEP84, the first motor control unit 170a carries out the field weakening current changing processing to increase the correction value ΔId_vol of a field weakening current.

As explained above, the first motor control unit 170a preferentially carries out the rotor angle changing processing of STEP80 to STEP84 if the phase voltage Vp exceeds the target voltage Vp_target, while it carries out the supply voltage changing processing if the phase voltage Vp reaches the upper limit θd_max of the variable range of the rotor angle θd. When the upper limit of the variable range of the DC/DC converter 151 is reached, the field weakening current changing processing is carried out.

If the phase voltage Vp is the target voltage Vp_target or less, then the processing of STEP71 to STEP73 is carried out to reduce the difference between the phase voltage Vp and the target voltage Vp_target so as to bring the phase voltage Vp close to the target voltage circle C (refer to FIG. 7). In STEP71, the first motor control unit 170a carries out the rotor phase difference changing processing to reduce the command value θd1_c of the rotor phase difference θd of the first motor 1a. Thus, the rotor phase difference θd of the first motor 1a increases and the induced voltage constant Ke of the first motor 1a increases accordingly.

If it is determined in subsequent STEP72 that the command value θd_c of the rotor phase difference θd is θd_min (a lower limit of the variable range of θd) or less, then the procedure proceeds to STEP73, or if the θd_c is larger than the θd_min, then the procedure proceeds to STEP74. In STEP73, the first motor control unit 170a carries out the supply voltage changing processing to reduce the command value Vdc_c of the output voltage Vdc of the DC/DC converter 151. Thus, the output voltage Vdc of the DC/DC converter 151 reduces and the target voltage Vp_target calculated by the target voltage circle calculator 90 decreases.

As explained above, the first motor control unit 170a preferentially carries out the rotor angle changing processing of STEP71 to STEP73 if the phase voltage is the target voltage Vp_target or less, while it carries out the supply voltage changing processing if the phase voltage reaches the lower limit θd_min of the variable range of the rotor angle θd.

Referring now to FIG. 10 and FIG. 11, advantages obtained by carrying out the processing according to the flowchart shown in FIG. 9 will be explained.

FIG. 10(a) shows a case where the phase voltage Vp is larger than the target voltage Vp_target (Vp is outside the target voltage circle C). In this case, the amount of energization from the inverter 62a to the first motor 1a is restricted, thus interfering the energization control of the first motor 1a. Therefore, the first motor control unit 170a first carries out the rotor phase difference changing processing to change the rotor phase difference θd in the direction for reducing the magnetic fluxes of fields (in the direction for increasing the rotor phase difference so as to weaken fields). This causes a reduction in the induced voltage constant Ke of the first motor 1a, and a back electromotive force E produced in the q-axis armature decreases by the aforesaid reduction in the induced voltage constant Ke. As a result, the phase voltage Vp approaches the circumference of the target voltage circle C, as shown in FIG. 10(b).

Subsequently, the first motor control unit 170a raises the output voltage Vdc of the DC/DC converter 151 by the supply voltage changing processing. This increases Vp_target calculated by the target voltage circle calculator 90, and as a result, the target voltage circle C expands, causing the phase voltage Vp to further approach the target voltage circle C, as shown in FIG. 10(c). The supply voltage changing processing is carried out by changing the output voltage command value Vdc_c relative to the DC/DC converter 151 through the intermediary of the DC voltage control unit 160.

Then, the first motor control unit 170a carries out the field weakening current changing processing to increase the d-axis current. This causes the phase voltage Vp to reach the circumference of the target voltage circle C, as shown in FIG. 10(d). Thus, the amount of energization from the inverter 62a to the first motor 1a can be increased by bringing the phase voltage Vp close to the target voltage circle C, thus making it possible to obviate the restriction on the amount of energization to the first motor 1a.

FIG. 11(a) shows a case where the phase voltage Vp is smaller than the Vp_target (Vp is inside the target voltage circle C). In this case, a power loss caused by switching in the inverter 62a increases. Hence, the first motor control unit 170a first carries out the rotor phase difference changing processing to change the rotor phase difference θd in the direction for increasing the magnetic fluxes of fields (in the direction for reducing the rotor phase difference so as to strengthen fields). This causes an increase in the induced voltage constant Ke of the first motor 1a, and the back electromotive force E produced in the q-axis armature increases by the aforesaid increase in the induced voltage constant Ke. As a result, the phase voltage Vp approaches the circumference of the target voltage circle C, as shown in FIG. 11(b).

Subsequently, the first motor control unit 170a carries out the supply voltage changing processing to lower the output voltage Vdc of the DC/DC converter 151. This reduces Vp_target calculated by the target voltage circle calculator 90. As a result, the target voltage circle C reduces, causing the phase voltage Vp to further approach the target voltage circle C and reach the circumference of the target voltage circle C, as shown in FIG. 11(c).

Thus, bringing the phase voltage Vp close to the target voltage circle C makes it possible to reduce the power loss caused by the switching in the inverter 62a. Moreover, ripple current superimposed over the current supplied to the first motor 1a decreases with a resultant reduction in copper loss incurred in the first motor 1a. There is an additional advantage in which the superposition of higher-frequency current decreases, so that iron loss incurred in the first motor 1a also decreases.

Referring now to the flowchart shown in FIG. 12, the procedure for setting the flags F1 and F3 by the torque response determiners 110 provided in the first motor control unit 170a and the second motor control unit 170b will be explained.

In STEP50 shown in FIG. 12, the torque response determiner 110 determines whether a change in the torque command value Tr_c is a specified value or more. The procedure proceeds to STEP51 if the torque command value Tr_c is the specified value or more, or branches to STEP60 if a change in the torque command value Tr_c is smaller than the specified value.

In the subsequent STEP51, the torque response determiner 110 determines whether the difference ΔVp between the phase voltage Vp and the target voltage Vp_target is a specified value ΔVp_lmt or less. The procedure proceeds to STEP52 if the ΔVp is the ΔVp_lmt or less, or branches to STEP53 if ΔVp exceeds ΔVp_lmt.

In STEP52, the torque response determiner 110 sets the flag F1 to OFF and sets the flag F3 to ON. Thus, referring to FIG. 5 and FIG. 6, changing the command value Ke_c of the induced voltage constant Ke by the induced voltage constant command value determiner 93 is disabled, while changing the correction value ΔId_vol of field weakening current by the field weakening current correction value calculator 121 is enabled. Thus, if the change rate of the torque command value Tr_c is large and ΔVp is small, then the execution of the field weakening current changing processing that is slow in response to a change of a command value is disabled, while the field weakening current changing processing that is quick in response is executed, thereby making it possible to promptly reduce the phase voltage Vp to the target voltage Vp_target or less.

In STEP60, the torque response determiner 110 sets both flag F1 and flag F3 to ON. Thus, referring to FIG. 5 and FIG. 6, changing the induced voltage constant Ke by the induced voltage constant command value determiner 93 and changing the correction value ΔId_vol of field weakening current by the field weakening current correction value calculator 121 are enabled. Thus, if the change rate of the torque command value Tr_c is small, then an increase in the loss in the first motor 1a and the second motor 1b caused by an increase in the d-axis current can be restrained by carrying out the rotor phase difference changing processing.

Referring now to FIG. 13 to FIG. 15, the processing for setting the flags F21, F22, F41, and F42 by the DC voltage control unit 160 and the processing for setting the command value Vdc_c of the output voltage Vdc of the DC/DC converter 151 will be explained.

The first motor operating condition calculator 161 provided in the DC voltage control unit 160 calculates an estimated value P1 of a loss incurred when the first motor 1a is operated and a temperature protection coefficient K1 for detecting the temperature of the first motor 1a. The second motor operating condition calculator 162 calculates an estimated value P2 of a loss incurred when the second motor 1b is operated and a temperature protection coefficient K2 for detecting the temperature of the second motor 1b.

First, referring to FIG. 13, the method for calculating the estimated value P1 of a loss in the first motor 1a will be explained. The estimated value P2 of loss in the second motor 1b can be calculated in the same manner.

FIG. 13(a) shows an equivalent circuit of the d-axis. In the figure, Ra and Rc denote the resistance of the d-axis armature, Ld denotes the inductance of the d-axis armature, and ωLqIoq denotes an induced voltage generated in the d-axis armature by the supply of q-axis current Iq. FIG. 13(b) shows an equivalent circuit of the q-axis. In the figure, Ra and Rc denote the resistance of the q-axis armature, Lq denotes the inductance of the q-axis armature, and ωLdIod denotes an induced voltage generated in the q-axis armature by the supply of d-axis current Id.

In the equivalent circuits shown in FIG. 13(a) and FIG. 13(b), torque Tr, output Pw, copper loss $W_c$, and iron loss $W_i$ of the first motor 1a can be calculated according to expression (5) to expression (8) given below.

$$T_r = 3[K_e I_{oq} + (L_d - L_q) I_{od} I_{oq}] \quad (5)$$

where Tr: torque; Ld: Inductance of d-axis armature; and Lq: Inductance of q-axis armature.

$$Pw = 3\omega[K_e I_{oq} + (L_d - L_q) I_{od} I_{oq}] \quad (6)$$

where Pw: Output of first motor $$W_c = 3R_a(I_d^2 + I_q^2) \quad (7)$$

where Wc: Copper loss in first motor $$W_i = \frac{V_{od}^2 + V_{oq}^2}{R_c} = \frac{\omega\sqrt{(L_d I_{od} + K_e)^2 + (L_q I_{oq})^2}}{R_c} \quad (8)$$

where Wi: Iron loss in first motor

Then, as indicated by the following expression (9), loss $W_{loss}$ in the first motor 1a is represented by the copper loss Wc in the above expression (7) and the iron loss Wi in the above expression (8), and the estimated value of the loss in the first motor 1a is denoted by P1.

$$P1 = W_{loss} = W_c + W_i \quad (9)$$

where $W_{loss}$: Loss in first motor; Wc: Copper loss in first motor; Wi: Iron loss in first motor; and P1: Estimated value of loss in first motor.

The estimated value P1 of the loss in the first motor 1a may be calculated by including mechanical loss in the first motor 1a or electric power loss or the like in the inverter 62a in addition to the copper loss Wc and the iron loss Wi.

Referring now to FIG. 14, a method for calculating the temperature protection coefficient K1 of the first motor 1a by the first motor operating condition calculator 161 will be explained. In the same manner, the temperature protection coefficient K2 of the second motor 1b is calculated by the second motor operating condition calculator 162.

As shown in FIG. 14(a), the first motor operating condition calculator 161 applies R1, which is output from the first motor control unit 170a, to an R1/Temp1 correspondence map 200 in order to acquire a corresponding temperature Temp1. Then, the first motor operating condition calculator 161 applies the temperature Temp1 to a Temp1/K1 correspondence map 201 to acquire a corresponding temperature protection coefficient K1. The data of the R1/Temp1 correspondence map 200 and the Temp1/K1 correspondence map 201 is stored in a memory beforehand.

FIG. 14(b) shows an example of the R1/Temp1 correspondence map 200, in which the axis of ordinates is set to the temperature Temp1 and the axis of abscissas is set to the resistance R1. The map is set such that the temperature Temp1 increases as the resistance R1 increases.

FIG. 14(c) shows an example of the Temp1/K1 correspondence map 201, in which the axis of ordinates is set to K1 and the axis of abscissas is set to Temp1. The map is set such that no temperature protection for the first motor 1a is required in a range wherein K1=0 (Temp1≦$T_{10}$), but once Temp1 exceeds $T_{10}$, K1 increases as Temp1 increases.

The first motor 1a and the second motor 1b have different heat capacities and heat resistance, so that an R2/Temp2 correspondence map for the second motor 1b is separately prepared from the R1/Temp1 correspondence map 200 for the first motor 1a. Similarly, a Temp2/K2 correspondence map for the second motor 1b is also separately prepared from the Temp1/K1 correspondence map for the first motor 1a.

Based on the estimated value P1 of the loss and the temperature protection coefficient K1 of the first motor 1a and the estimated value P2 of the loss and the temperature protection coefficient K2 of the second motor 1b, the operating condition determiner 163 determines setting ON/OFF of the flags F21, F22, F41, and F42, and also determines the command value Vdc_c of the output voltage Vdc of the DC/DC converter 151. The following will explain the processing implemented by the operating condition determiner 163 according to the flowchart shown in FIG. 15.

In STEP1 of FIG. 15, the operating condition determiner 163 determines whether the temperature protection coefficient K1 of the first motor 1a is larger than the temperature protection coefficient K2 of the second motor 1b. The operating condition determiner 163 proceeds to STEP2 if K1 is larger than K2, or branches to STEP10 if K1 is K2 or less.

In STEP2, the operating condition determiner 163 sets the flag F21 to ON and sets the flag F22 to OFF. Thus, referring to FIG. 5, the output of the command value Vdc1 of the output voltage Vdc of the DC/DC converter 151 by the DC voltage command value determiner 120 of the first motor control unit 170a is enabled. Further, referring to FIG. 6, the output of the command value Vdc2 of the output voltage Vdc of the DC/DC converter 151 by the DC voltage command value determiner 120 of the second motor control unit 170b is disabled.

In the subsequent STEP3, the operating condition determiner 163 determines whether the detection value Idc_s of input/output current to/from the DC/DC converter 151 is approximately zero (Idc_c≈0). If Idc_s is approximately zero, then the operating condition determiner 163 proceeds to STEP4 wherein it sets the flag F41 to OFF and the flag F42 to ON.

If Idc_s is approximately zero, it means that the first motor 1a is being driven by the electric power generated by the second motor 1b. Hence, the output of the correction value ΔT_vol of the torque command value by the DC voltage PI control unit 130 of the first motor control unit 170a is disabled by setting the flag F41 to OFF, while the output of the correction value ΔT_vol of the torque command by the DC voltage PI control unit 130 of the second motor control unit 170b is enabled by setting the flag F42 to ON.

Thus, the torque command value Tr_c of the second motor 1b is changed such that the difference ΔVp between the phase voltage Vp and the target voltage Vp_target (corresponding to the second target voltage in the present invention) of the first motor 1a is reduced, causing the voltage of electric power generated by the second motor 1b to be changed. The target voltage Vp_target when the second motor 1b operates as the generator may be set at a voltage that is different from the target voltage Vp_target when the second motor 1b and the first motor 1a both operate as motors.

Meanwhile, if it is determined in STEP3 that Idc_s is not approximately zero, then the operating condition determiner 163 branches to STEP40 wherein it sets both flags F41 and F42 to OFF, and determines the command value Vdc_c of the output voltage of the DC/DC converter 151 to Vdc1. If Idc_s is not approximately zero, it means that the first motor 1a is being driven by the electric power output from the DC/DC converter 151.

Therefore, the operating condition determiner 163 sets both flags F41 and F42 to OFF to disable the output of the correction value ΔT_vol of the torque command by the DC voltage PI control unit 130 of the first motor control unit 170a, and also disables the output of the correction value ΔT_vol of the torque command value by the DC voltage PI control unit 130 of the second motor control unit 170b.

Setting the command value Vdc_c of the output voltage of the DC/DC converter 151 by the DC voltage control unit 160 to Vdc1 reduces the difference between the phase voltage Vp and the target voltage Vp_target of the first motor 1a. This makes it possible to reduce the loss in the first motor 1a, thereby protecting the first motor 1a from a temperature rise.

Further, in STEP10, the operating condition determiner 163 determines whether the temperature protection coefficient K1 of the first motor 1a is smaller than the temperature protection coefficient K2 of the second motor 1b and K2 is larger than zero (requiring temperature protection).

The operating condition determiner 163 branches to STEP20 If K1 is smaller than K2 and K2 is larger than zero, or proceeds to STEP11 if K1 is K2 or more or K2 is zero. In STEP20, the operating condition determiner 163 determines whether the estimated value P1 of the loss in the first motor 1a is larger than the estimated value P2 of the loss in the second motor 1b. Then, the operating condition determiner 163 proceeds to STEP2 if P1 is larger than P2 or it branches to STEP11 if P1 is P2 or less.

In this case, if the values of the temperature protection coefficient K1 of the first motor 1a and the temperature protection coefficient K2 of the second motor 1b are the same and the estimated value P1 of the loss in the first motor 1a is larger than the estimated value P2 of the loss in the second motor 1b, then the processing of STEP2 to STEP4 and STEP40 described above is carried out to reduce the loss in the first motor 1a. This protects the first motor 1a from a temperature rise and also reduces the total loss in the first motor 1a and the second motor 1b.

Further, in STEP11, the operating condition determiner 163 sets the flag F21 to OFF and the flag F22 to ON. This disables the output of the command value Vdc1 of the output voltage of the DC/DC converter 151 by the DC voltage command value determiner 120 of the first motor control unit 170a. Further, the output of the command value Vdc2 of the output voltage of the DC/DC converter 151 by the DC voltage command value determiner 120 of the second motor control unit 170b is enabled.

In the subsequent STEP12, the operating condition determiner 163 determines whether the detection value Idc_s of input/output current to/from the DC/DC converter 151 is approximately zero (Idc_c≈0). If Idc_s is approximately zero, then the operating condition determiner 163 proceeds to STEP13 wherein it sets the flag F41 to ON and the flag F42 to OFF.

If Idc_s is approximately zero, it means that the second motor 1*b* is being driven by the electric power generated by the first motor 1*a*. Hence, the output of the correction value ΔT_vol of the torque command value by the DC voltage PI control unit 130 of the second motor control unit 170*b* is disabled by setting the flag F42 to OFF, while the output of the correction value ΔT_vol of the torque command by the DC voltage PI control unit 130 of the first motor control unit 170*a* is enabled by setting the flag F41 to ON.

Thus, the torque command value Tr_c of the first motor 1*a* is changed such that the difference ΔVp between the phase voltage Vp and the target voltage Vp_target (corresponding to the second target voltage in the present invention) of the second motor 1*b* is reduced, causing the voltage of electric power generated by the first motor 1*a* to be changed. The target voltage Vp_target when the first motor 1*a* operates as the generator may be set at a voltage that is different from the target voltage Vp_target when the first motor 1*a* and the second motor 1*b* both operate as motors.

Meanwhile, if it is determined in STEP12 that Idc_s is not approximately zero, then the operating condition determiner 163 branches to STEP30 wherein it sets both flags F41 and F42 to OFF, and determines the command value Vdc_c of the output voltage of the DC/DC converter 151 to Vdc2. If Idc_s is not in the vicinity of approximately zero, it means that the second motor 1*b* is being driven by the electric power output from the DC/DC converter 151.

Therefore, the operating condition determiner 163 sets both flags F41 and F42 to OFF to disable the output of the correction value ΔT_vol of the torque command by the DC voltage PI control unit 130 of the first motor control unit 170*a*, and also disables the output of the correction value ΔT_vol of the torque command by the DC voltage PI control unit 130 of the second motor control unit 170*b*.

Setting the command value Vdc_c of the output voltage of the DC/DC converter 151 by the DC voltage control unit 160 to Vdc2 reduces the difference between the phase voltage Vp and the target voltage Vp_target of the second motor 1*b*. This makes it possible to reduce the loss in the second motor 1*b*, thus protecting the second motor 1*b* from a temperature rise.

The processing illustrated by the flowchart of FIG. 15 explained above is carried out on the first motor 1*a* or the second motor 1*b*, whichever having a higher temperature, to change the supply voltage or to change the electric power to be generated so as to reduce the difference between the phase voltage Vp and the target voltage Vp_target. Thus, the total loss in the first motor 1*a* and the second motor 1*b* can be reduced, while protecting the motor which has a less allowance for a temperature rise.

If the temperatures of the first motor 1*a* and the second motor 1*b* are the same, the processing for changing the supply voltage or the processing for reducing the difference between the phase voltage Vp and the target voltage Vp_target by changing the electric power to be generated is carried out on the motor which incurs a larger loss. Thus, if there is no difference in allowance for a temperature rise, the total loss in the first motor 1*a* and the second motor 1*b* can be reduced by reducing the loss in the motor incurring a larger loss.

In the present embodiment, the first motor 1*a* and the second motor 1*b*, which are DC brushless motors provided with double-rotors, have been shown as the motors to which the present invention applies. The present invention, however, can be also applied to a construction having a plurality of general permanent magnet type rotary motors, each motor having a single rotor. In this case, the processing for changing a rotor phase difference is not carried out.

In the present embodiment, the temperatures of the first motor 1*a* and the second motor 1*b* have been detected and the difference between the phase voltage Vp and the target voltage Vp_target in the motor having a higher temperature has been reduced. However, the advantages of the present invention can be obtained alternatively by reducing the difference between the phase voltage Vp and the target voltage Vp_target in the first motor 1*a* or the second motor 1*b* having a smaller loss, without performing such temperature detection.

Further, the present invention can be applied also to a construction having a mixture of the permanent magnet type rotary motor equipped with a single rotor and the permanent magnet type rotary motor equipped with a double-rotor. In this case, the processing for changing the rotor phase difference is not carried out on the permanent magnet type rotary motor equipped with a single rotor.

Further, in the present embodiment, both the first motor 1*a* and the second motor 1*b* have operated also as generators. The present invention, however, can be applied also to a construction having a plurality of motors operating only as motors or a construction having a mixture of a motor operating only as a motor and a motor operating as a motor and a generator.

Further, the present embodiment has shown a controller which handles the motor 1 by converting it into an equivalent circuit based on the dq coordinate system, which is a two-phase DC rotation coordinate, as the controller for a motor in accordance with the present invention. However, the present invention can be applied also to a case where a motor is converted into an equivalent circuit based on an αβ coordinate system, which is a two-phase AC fixed coordinate system, or a case where a motor is handled with its three-phase AC as it is.

What is claimed is:

1. A controller for a motor comprising:
    a plurality of drive circuits for driving a plurality of permanent magnet type rotary motors;
    a DC power source for supplying DC power to the drive circuits;
    an output voltage changing means for changing an output voltage of the DC power source;
    a motor loss estimating means for determining, on each of the motors, an estimated value of a loss, which is incurred when driving a motor, on the basis of at least one of a loss in the drive circuit and a loss in the motor driven by the drive circuit; and
    a voltage difference reduction controlling means which carries out, when driving the plurality of motors by the plurality of drive circuits, supply voltage changing processing to change the voltage of DC power supplied to the drive circuit for driving a motor that has a largest estimated value of loss by the output voltage changing means so as to reduce a difference between a phase voltage, which is a resultant vector of the voltage between the terminals of an armature of each phase of the motor and a first target voltage, which is set on the basis of an output voltage of the DC power source.

2. The controller for a motor according to claim 1, wherein the voltage difference reduction controlling means carries out, on a motor having a largest estimated value of loss, field weakening current changing processing for changing the energization amount of a field weakening current for producing a voltage with a sign that is reversed from the sign of an induced voltage generated in an armature of the motor, thereby reducing the difference between the phase voltage of the motor and the first target voltage.

3. The controller for a motor according to claim 1, wherein at least one of the motors is a double-rotor motor with a first rotor and a second rotor which have a plurality of magnetic fields by permanent magnets and which are disposed around a rotating shaft, and the voltage difference reduction controlling means carries out rotor phase difference changing processing for changing a rotor phase difference as the phase difference between the first rotor and the second rotor of the double-rotor motor, so as to reduce the difference between the phase voltage and the first target voltage of the double-rotor motor in the case where a motor having the largest estimated value of loss is the double-rotor motor.

4. The controller for a motor according to claim 1, further comprising a motor temperature detecting means for detecting the temperature of each of the motors, wherein in the case where there is a motor having a temperature that is higher than the temperature of the motor estimated to have a largest loss, then the voltage difference reduction controlling means prohibits execution of the supply voltage changing processing on the motor estimated to have the largest loss and carries out the supply voltage changing processing on the motor having the higher temperature thereby to reduce the difference between the phase voltage and the first target voltage of the motor having the higher temperature.

5. The controller for a motor according to claim 1, wherein the DC power source is a storage battery, and at least one of the motors acts also as a generator to supply power to the drive circuits of other motors and also to supply charging current to the storage battery through the intermediary of the voltage changing means, and in the case where the motor estimated to have a largest loss is a motor other than the motor in operation as a generator and the input/output current of the voltage changing means is a predetermined level or less, then the voltage difference reduction controlling means prohibits the execution of the supply voltage changing processing and controls the output power of the motor in operation as the generator such that the difference between a second target voltage, which is set on the basis of the voltage supplied to the drive circuit of the motor estimated to have the largest loss by the motor in operation as the generator, and the phase voltage of the motor estimated to have the largest loss is reduced.

6. The controller for a motor according to claim 1, further comprising means which handles the motor by converting the motor into an equivalent circuit in terms of a two-phase AC fixed coordinate system or a two-phase DC rotation coordinate system based on the position of the first rotor, and calculates the magnitude of a resultant vector of a converted value in the equivalent circuit of the voltage between the terminals of the armature of the motor as the phase voltage.

7. A control method for a motor for controlling the operation of a rotary motor by a controller for a motor having a plurality of drive circuits for driving a plurality of permanent magnet rotary motors, a DC power source for supplying DC power to the drive circuits, and an output voltage changing means for changing an output voltage of the DC power source, the control method comprising:

a motor loss estimating step wherein the controller determines, for each of the motors, an estimated value of loss incurred when driving the motors on the basis of at least one of the loss in the drive circuit or the loss in a motor driven by the drive circuit; and a voltage difference reducing step wherein, when driving the plurality of motors by the plurality of drive circuits, the controller reduces the difference between a phase voltage, which is a resultant vector of a voltage between the terminals of an armature of each phase of the motor, and a first target voltage, which is set on the basis of an output voltage of the DC power source, by carrying out supply voltage changing processing for changing the voltage of the DC power supplied to the drive circuit that drives the motor having a largest estimated value of loss by the output voltage changing means.

* * * * *